US012272369B1

(12) United States Patent
Chhetri et al.

(10) Patent No.: US 12,272,369 B1
(45) Date of Patent: Apr. 8, 2025

(54) DEREVERBERATION AND NOISE REDUCTION

(71) Applicant: Amazon Technologies, Inc., Seattle, WA (US)

(72) Inventors: Amit Singh Chhetri, Sunnvale, CA (US); Mrudula V. Athi, Natick, MA (US); Pradeep Kumar Govindaraju, San Jose, CA (US); Rong Hu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 151 days.

(21) Appl. No.: 17/578,737

(22) Filed: Jan. 19, 2022

(51) Int. Cl.
    *G10L 21/0216* (2013.01)
    *G10L 21/0208* (2013.01)
    *G10L 21/10* (2013.01)
    *G10L 25/30* (2013.01)

(52) U.S. Cl.
    CPC .......... *G10L 21/0216* (2013.01); *G10L 21/10* (2013.01); *G10L 25/30* (2013.01); *G10L 2021/02082* (2013.01)

(58) Field of Classification Search
    CPC ..... G10L 21/0216; G10L 21/10; G10L 25/30; G10L 2021/02082
    See application file for complete search history.

(56) References Cited

U.S. PATENT DOCUMENTS

| | | | |
|---|---|---|---|
| 9,595,997 B1 * | 3/2017 | Yang | H04B 3/23 |
| 10,522,167 B1 * | 12/2019 | Ayrapetian | G10L 17/18 |
| 11,521,635 B1 * | 12/2022 | Chhetri | G06N 3/0455 |
| 2018/0040333 A1 * | 2/2018 | Wung | G10L 21/0232 |
| 2019/0172476 A1 * | 6/2019 | Wung | G10L 21/0232 |
| 2019/0172480 A1 * | 6/2019 | Kaskari | G10L 25/78 |
| 2019/0222691 A1 * | 7/2019 | Shah | G10L 21/0208 |
| 2020/0135220 A1 * | 4/2020 | Lee | G10L 19/032 |
| 2020/0312346 A1 * | 10/2020 | Fazeli | G06N 3/088 |
| 2020/0327887 A1 * | 10/2020 | Malik | G10L 15/20 |
| 2020/0365152 A1 * | 11/2020 | Han | G10L 15/02 |
| 2021/0294829 A1 * | 9/2021 | Bender | G10L 15/16 |
| 2022/0115028 A1 * | 4/2022 | Dhawan | G10L 15/00 |

(Continued)

OTHER PUBLICATIONS

Ma L, Yang S, Gong Y, Wang X, Wu Z. Echofilter: End-to-end neural network for acoustic echo cancellation. arXiv preprint arXiv:2105.14666. May 31, 2021. (Year: 2021).*

*Primary Examiner* — Fariba Sirjani
(74) *Attorney, Agent, or Firm* — Pierce Atwood LLP

(57) ABSTRACT

A system configured to improve audio processing by performing dereverberation and noise reduction during a communication session. In some examples, the system may include a deep neural network (DNN) configured to perform speech enhancement, which is located after an Acoustic Echo Cancellation (AEC) component. For example, the DNN may process isolated audio data output by the AEC component to jointly mitigate additive noise and reverberation. In other examples, the system may include a DNN configured to perform acoustic interference cancellation, which may jointly mitigate additive noise, reverberation, and residual echo, removing the need to perform residual echo suppression processing. The DNN is configured to process complex-valued spectrograms corresponding to the isolated audio data and/or estimated echo data generated by the AEC component.

20 Claims, 11 Drawing Sheets

(56) References Cited

U.S. PATENT DOCUMENTS

| | | | |
|---|---|---|---|
| 2022/0254332 A1* | 8/2022 | Cartwright | G10L 15/22 |
| 2023/0038982 A1* | 2/2023 | Narayanan | G10L 15/063 |
| 2023/0042468 A1* | 2/2023 | Wang | G10L 21/0264 |
| 2023/0065089 A1* | 3/2023 | Lee | G06F 40/35 |
| 2023/0096876 A1* | 3/2023 | Yu | G10L 21/0224 |
| | | | 704/200 |
| 2023/0154480 A1* | 5/2023 | Xu | G10L 21/0264 |
| | | | 704/270 |
| 2023/0186782 A1* | 6/2023 | Hoffmann | G10H 1/0008 |
| | | | 84/470 R |
| 2023/0274754 A1* | 8/2023 | Ahn | G10L 21/0232 |
| | | | 704/226 |
| 2024/0135954 A1* | 4/2024 | Chang | G06N 3/08 |

* cited by examiner

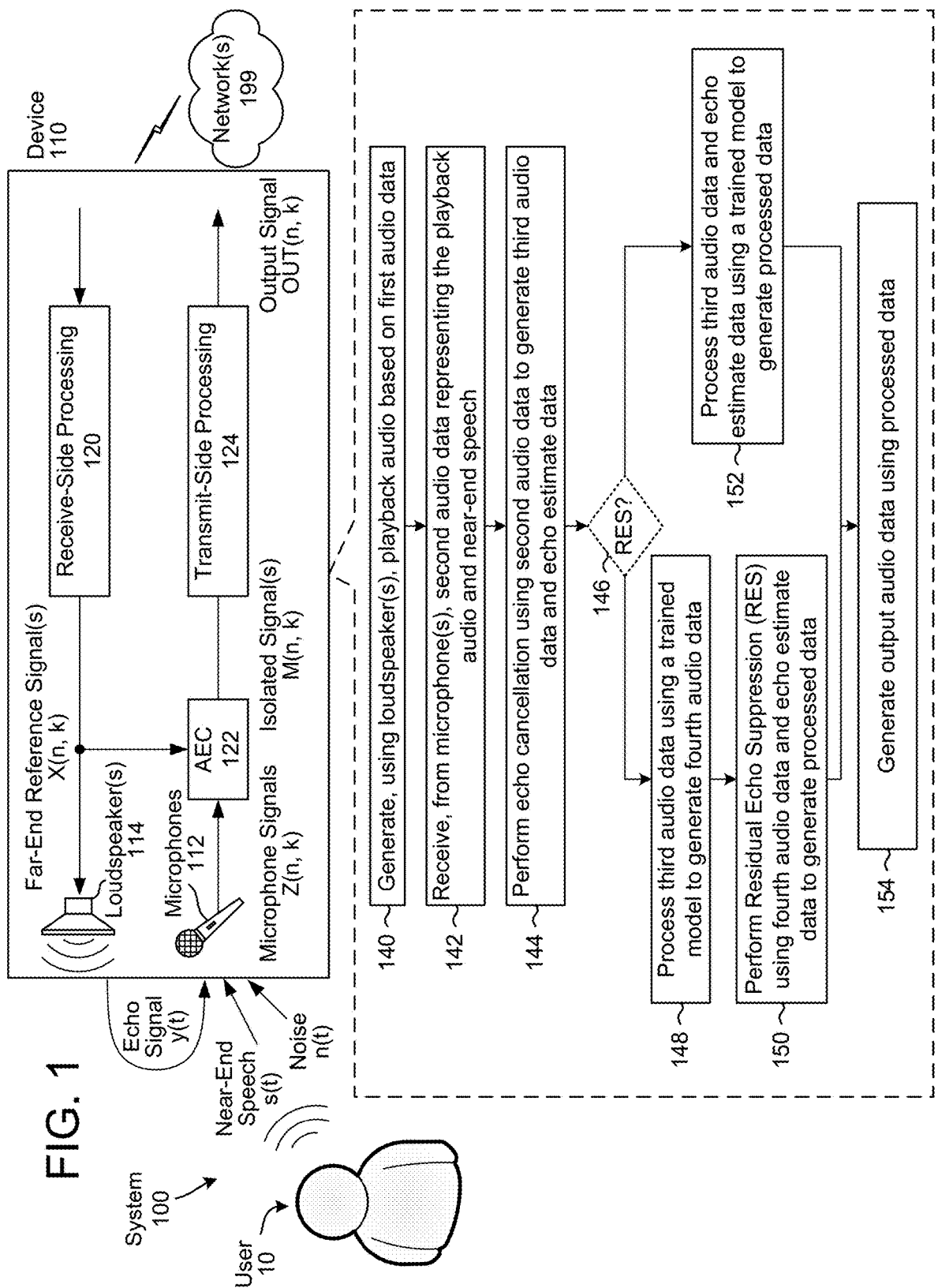

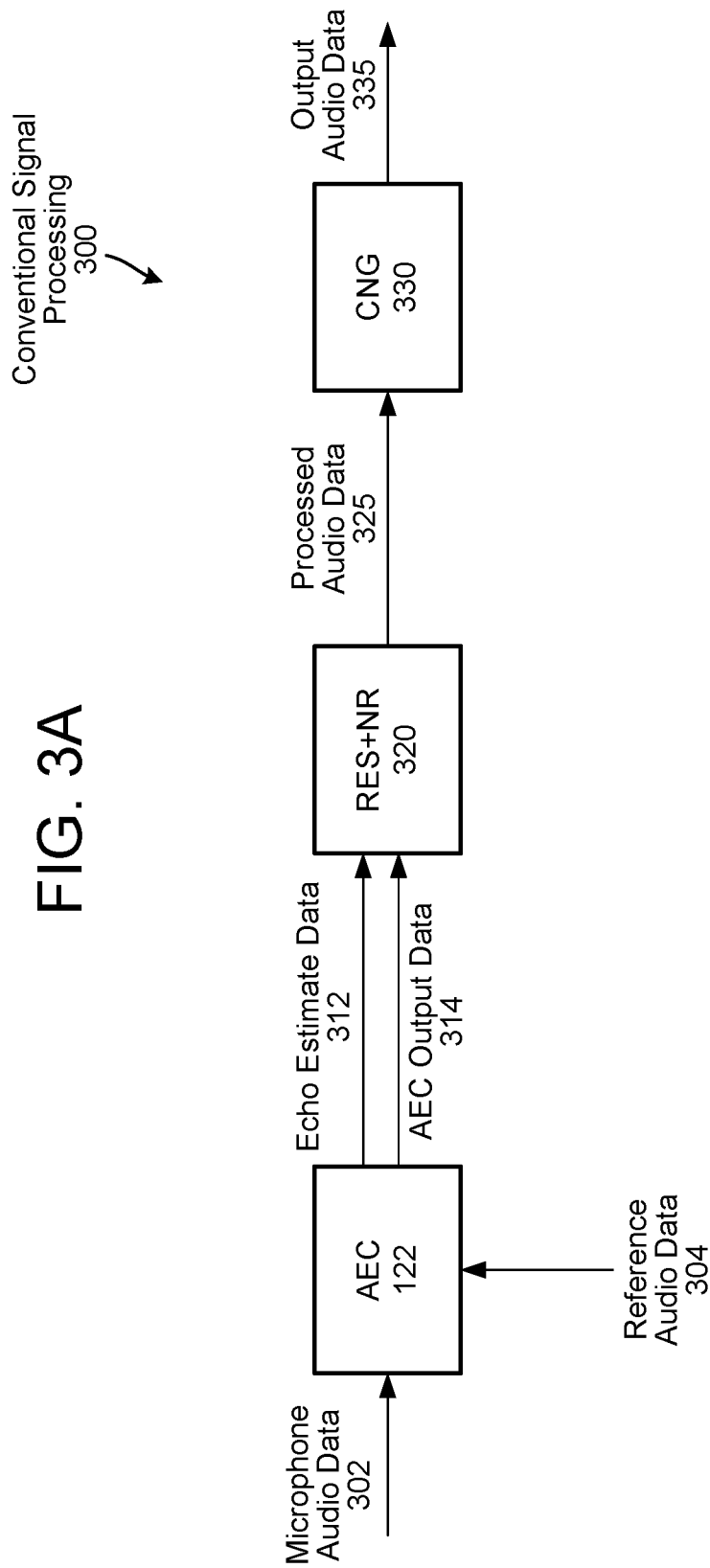
FIG. 3A —PRIOR ART—

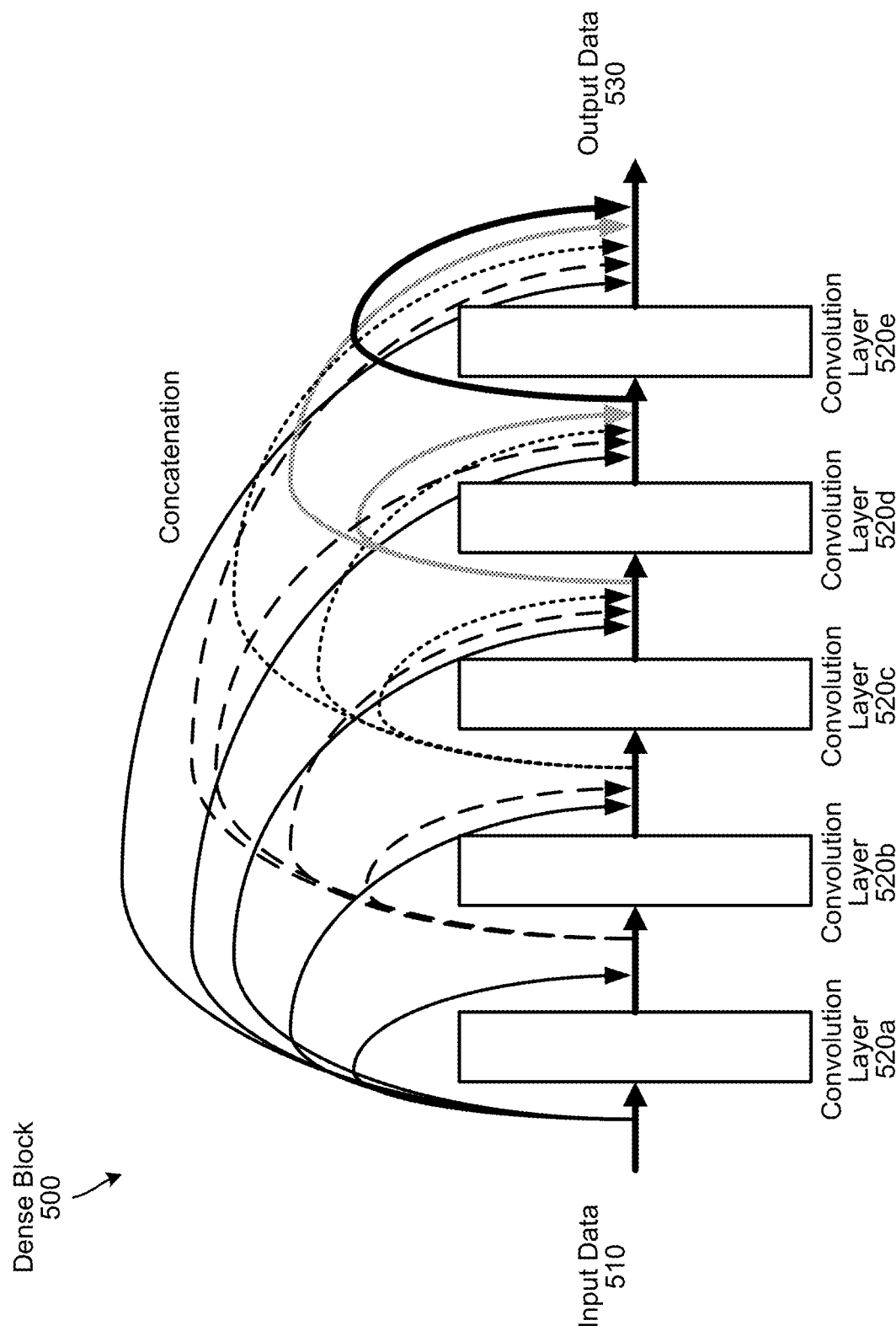

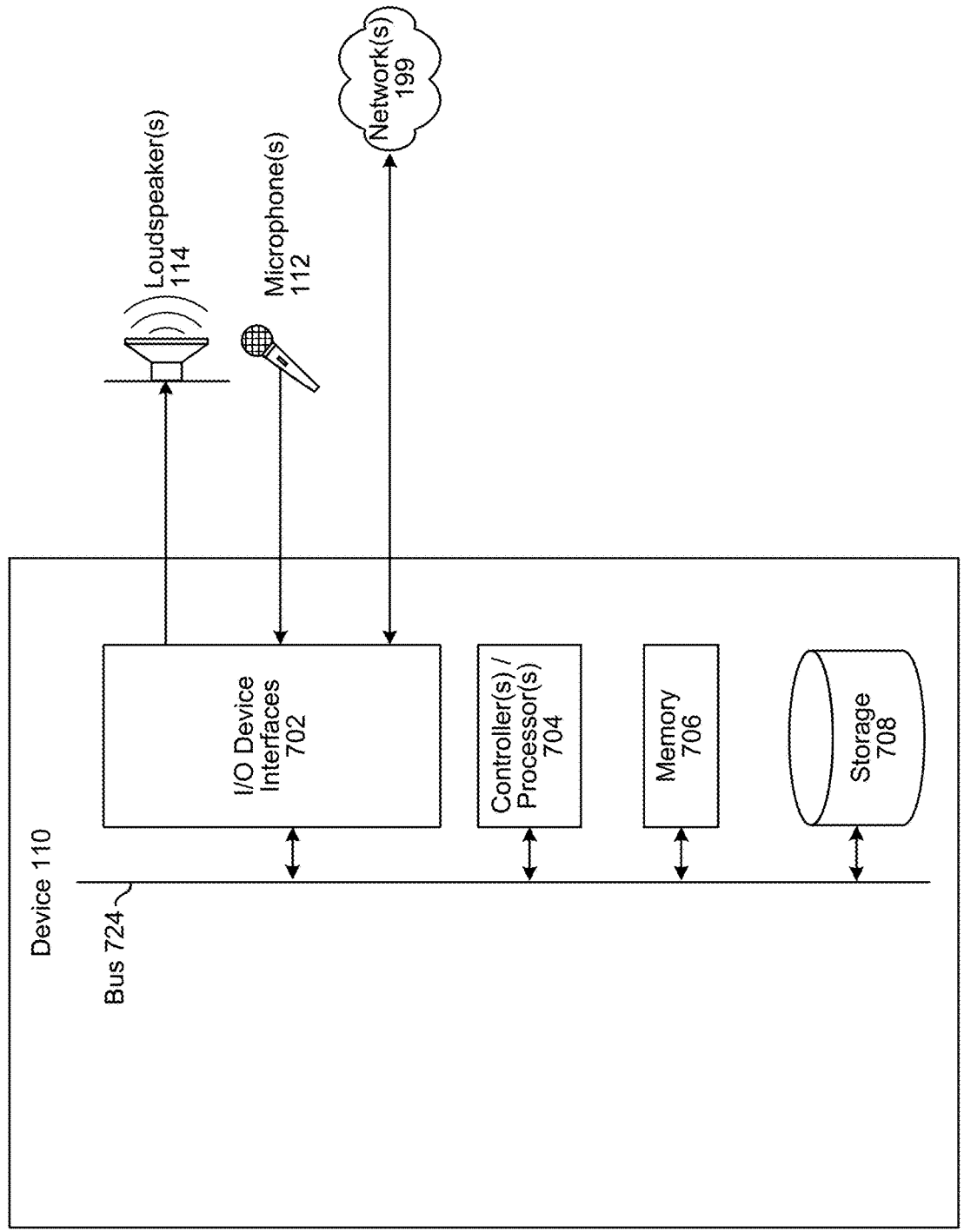

DEREVERBERATION AND NOISE REDUCTION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system configured to perform dereverberation and noise reduction within a voice processing pipeline according to embodiments of the present disclosure.

FIG. 3A illustrates example components of a conventional voice processing pipeline.

FIG. 5 illustrates an example structure of a dense block according to embodiments of the present disclosure.

FIG. 7 is a block diagram conceptually illustrating example components of a system according to embodiments of the present disclosure.

DETAILED DESCRIPTION

Figure 2A:
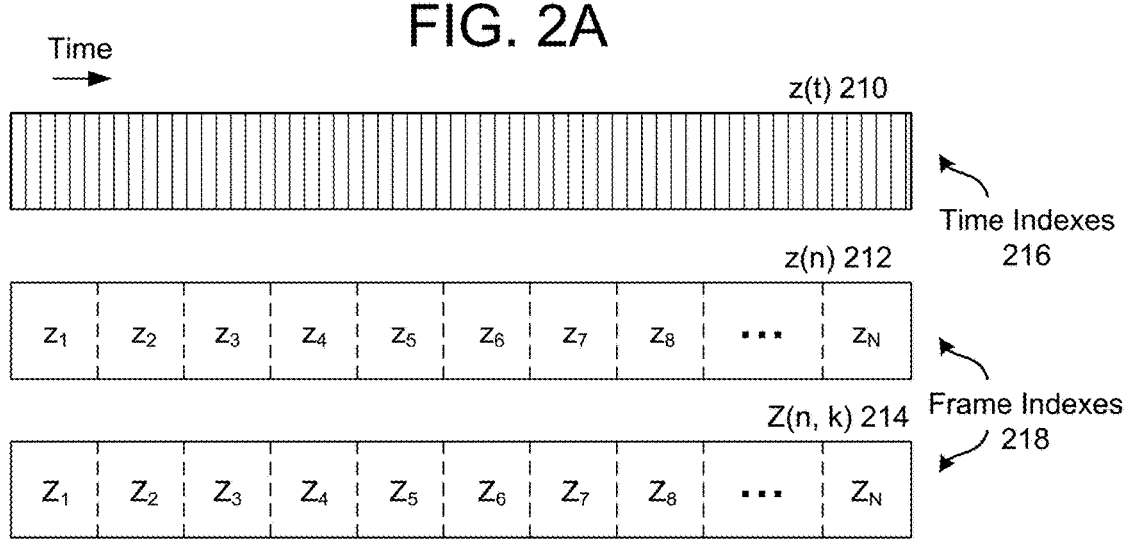
FIGS. 2A-2C illustrate examples of frame indexes, tone indexes, and channel indexes.

Electronic devices may be used to capture and process audio data. The audio data may be used for voice commands and/or may be output by loudspeakers as part of a communication session. During a communication session, loudspeakers may generate audio using playback audio data while a microphone generates local audio data. An electronic device may perform audio processing, such as acoustic echo cancellation, residual echo suppression, noise reduction, and/or the like, to remove audible noise and an "echo" signal corresponding to the playback audio data from the local audio data, isolating local speech to be used for voice commands and/or the communication session.

To improve an audio quality during voice communication, devices, systems and methods are disclosed that perform dereverberation and noise reduction during a communication session. For example, a device may include a deep neural network (DNN) configured to perform speech enhancement, which is located after an Acoustic Echo Cancellation (AEC) component. For example, the DNN may process isolated audio data output by the AEC component to jointly mitigate additive noise and reverberation. In other examples, the system may include a DNN configured to perform acoustic interference cancellation. For example, the DNN may process the isolated audio data and estimated echo data generated by the AEC component to jointly mitigate additive noise, reverberation, and residual echo removing the need to perform residual echo suppression processing. The DNN is configured to process complex-valued spectrograms corresponding to the isolated audio data and/or estimated echo data generated by the AEC component.

FIG. 1 illustrates a high-level conceptual block diagram of a system 100 configured to perform dereverberation and noise reduction within a voice processing pipeline. As illustrated in FIG. 1, the system 100 may include a device 110 that may be communicatively coupled to network(s) 199 and may include one or more microphone(s) 112 in a microphone array and/or one or more loudspeaker(s) 114. However, the disclosure is not limited thereto and the device 110 may include additional components without departing from the disclosure.

The device 110 may be an electronic device configured to send audio data to and/or receive audio data. For example, the device 110 (e.g., local device) may receive playback audio data (e.g., far-end reference audio data, represented in FIG. 1 as far-end reference signal(s) $X(n, k)$) from a remote device and the playback audio data may include remote speech originating at the remote device. During a communication session, the device 110 may generate output audio corresponding to the playback audio data using the one or more loudspeaker(s) 114. While generating the output audio, the device 110 may capture microphone audio data (e.g., input audio data, represented in FIG. 1 as microphone signals $Z(n, k)$) using the one or more microphone(s) 112. In addition to capturing desired speech (e.g., the microphone audio data includes a representation of local speech from a user 10, represented in FIG. 1 as near-end speech $s(t)$), the device 110 may capture a portion of the output audio generated by the loudspeaker(s) 114 (including a portion of the remote speech), which may be referred to as an "echo" or echo signal $y(t)$, along with additional acoustic noise $n(t)$ (e.g., undesired speech, ambient acoustic noise in an environment around the device 110, etc.), as discussed in greater detail below.

For ease of illustration, some audio data may be referred to as a signal, such as a far-end reference signal(s) $x(t)$, an echo signal $y(t)$, an echo estimate signal $y'(t)$, microphone signals $z(t)$, isolated signal(s) $m(t)$ (e.g., error signal $m(t)$), and/or the like. However, the signals may be comprised of audio data and may be referred to as audio data (e.g., far-end reference audio data $x(t)$, echo audio data $y(t)$, echo estimate audio data $y'(t)$, microphone audio data $z(t)$, isolated audio data $m(t)$, error audio data $m(t)$, etc.) without departing from the disclosure.

As will be described in greater detail below with regard to FIGS. 2A-2C, an audio signal may be represented in the time domain (e.g., far-end reference signal(s) $x(t)$) or in a frequency/subband domain (e.g., far-end reference signal(s) $X(n, k)$) without departing from the disclosure. In some examples, audio signals generated by microphones 112, output to the loudspeaker(S) 114, and/or sent via network(s) 199 are time domain signals (e.g., $x(t)$), and the device 110 converts these time domain signals to the frequency/subband domain during audio processing. For ease of illustration, however, FIG. 1 represents the far-end reference signal(s) $X(n, k)$, the microphone signals $Z(n, k)$, and the output signal $OUT(n, k)$ in the frequency/subband domain.

During a communication session, the device 110 may receive far-end reference signal(s) $x(t)$ (e.g., playback audio data) from a remote device/remote server(s) via the network(s) 199 and may generate output audio (e.g., playback audio) based on the far-end reference signal(s) $x(t)$ using the one or more loudspeaker(s) 114. Using one or more microphone(s) 112 in the microphone array, the device 110 may capture input audio as microphone signals z(t) (e.g., near-end reference audio data, input audio data, microphone audio data, etc.), may perform audio processing to the microphone signals z(t) to generate an output signal out(t) (e.g., output audio data), and may send the output signal out(t) to the remote device/remote server(s) via the network (s) 199.

In some examples, the device 110 may send the output signal out(t) to the remote device as part of a Voice over Internet Protocol (VOIP) communication session. For example, the device 110 may send the output signal out(t) to the remote device either directly or via remote server(s) and may receive the far-end reference signal(s) x(t) from the remote device either directly or via the remote server(s). However, the disclosure is not limited thereto and in some examples, the device 110 may send the output signal out(t) to the remote server(s) in order for the remote server(s) to determine a voice command. For example, during a communication session the device 110 may receive the far-end reference signal(s) x(t) from the remote device and may generate the output audio based on the far-end reference signal(s) x(t). However, the microphone signal z(t) may be separate from the communication session and may include a voice command directed to the remote server(s). Therefore, the device 110 may send the output signal out(t) to the remote server(s) and the remote server(s) may determine a voice command represented in the output signal out(t) and may perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over loudspeaker(s) 114, capture audio using microphone(s) 112, or the like), multimedia devices (e.g., play videos using a display, such as a television, computer, tablet or the like), smart home devices (e.g., change temperature controls, turn on/off lights, lock/unlock doors, etc.) or the like.

In audio systems, acoustic echo cancellation (AEC) processing refers to techniques that are used to recognize when a device has recaptured sound via microphone(s) after some delay that the device previously output via loudspeaker(s). The device may perform AEC processing by subtracting a delayed version of the original audio signal (e.g., far-end reference signal(s) X(n, k)) from the captured audio (e.g., microphone signal(s) Z(n, k)), producing a version of the captured audio that ideally eliminates the "echo" of the original audio signal, leaving only new audio information. For example, if someone were singing karaoke into a microphone while prerecorded music is output by a loudspeaker, AEC processing can be used to remove any of the recorded music from the audio captured by the microphone, allowing the singer's voice to be amplified and output without also reproducing a delayed "echo" of the original music. As another example, a media player that accepts voice commands via a microphone can use AEC processing to remove reproduced sounds corresponding to output media that are captured by the microphone, making it easier to process input voice commands.

The device 110 may perform audio processing to the microphone signals Z(n, k) to generate the output signal OUT(n, k). For example, the device 110 may input the microphone signal(s) Z(n, k) to a voice processing pipeline and may perform a series of steps using an AEC component 122 and transmit-side processing 124 to improve an audio quality associated with the output signal OUT(n, k). For example, the device 110 may perform acoustic echo cancellation (AEC) processing, residual echo suppression (RES) processing, noise reduction (NR) processing, comfort noise generation (CNG) processing, dereverberation (DER) processing, and/or other audio processing to isolate local speech captured by the microphone(s) 112 and/or to suppress unwanted audio data (e.g., echoes and/or noise). Thus, the device 110 may include an AEC component 122 configured to perform AEC processing to perform echo cancellation, a RES component configured to perform RES processing to suppress a residual echo signal, a noise reduction (NR) component configured to perform NR processing to attenuate a noise signal, a CNG component configured to perform CNG processing and smooth out the signal after being attenuated by the AEC processing and/or the RES processing, and/or a DER component configured to perform DER processing to reduce and/or remove reverberation.

As illustrated in FIG. 1, the device 110 may receive audio data from a remote device, may process the audio data using receive-side processing 120 to generate far-end reference signal(s) (e.g., playback audio data), and may generate playback audio (e.g., echo signal y(t)) using the loudspeaker(s) 114. While the device 110 may generate the playback audio using the far-end reference signal(s) x(t) in the time domain, for ease of illustration FIG. 1 represents the far-end reference signal(s) X(n, k) in the frequency/subband domain as the AEC component 122 performs echo cancellation in the subband domain. The far-end reference signal(s) may be referred to as far-end reference signal(s) (e.g., far-end reference audio data), playback signal(s) (e.g., playback audio data), and/or the like.

The one or more microphone(s) 112 in the microphone array may capture microphone signals (e.g., microphone audio data, near-end reference signals, input audio data, etc.), which may include the echo signal y(t) along with near-end speech s(t) from the user 10 and noise n(t). While the device 110 may generate the microphone signals z(t) in the time domain, for ease of illustration FIG. 1 represents the microphone signals Z(n, k) in the frequency/subband domain as the AEC component 122 performs echo cancellation in the subband domain.

To isolate the local speech (e.g., near-end speech s(t) from the user 10), the device 110 may include the AEC component 122, which may subtract a portion of the far-end reference signal(s) X(n, k) from the microphone signal(s) Z(n, k) and generate isolated signal(s) M(n, k) (e.g., error signal(s)). As the AEC component 122 does not have access to the echo signal y(t) itself, the AEC component 122 and/or an additional component (not illustrated) may use the far-end reference signal(s) X(n, k) to generate reference signal(s) (e.g., estimated echo signal(s)), which corresponds to the echo signal y(t). Thus, when the AEC component 122 removes the reference signal(s), the AEC component 122 is removing at least a portion of the echo signal y(t). Therefore, the output (e.g., isolated signal(s) M(n, k)) of the AEC component 122 may include the near-end speech s(t) along with portions of the echo signal y(t) and/or the noise n(t) (e.g., difference between the reference signal(s) and the actual echo signal y(t) and noise n(t)).

To further improve an audio quality of the output signal, the device 110 may include transmit-side processing 124 configured to perform residual echo suppression, noise reduction, and/or additional processing. In some examples, the transmit-side processing 124 may perform RES processing to the isolated signal(s) M(n, k) in order to dynamically suppress unwanted audio data (e.g., the portions of the echo signal y(t) and the noise n(t) that were not removed by the AEC component 122). For example, a RES component may attenuate the isolated signal(s) M(n, k) to generate a first audio signal, removing and/or reducing the unwanted audio data from the first audio signal. However, the device 110 may disable RES processing in certain conditions, such as when near-end speech s(t) is present in the isolated signal(s) M(n, k) (e.g., near-end single talk conditions or double-talk conditions are present), although the disclosure is not limited thereto. For example, when the device 110 detects that the near-end speech s(t) is present in the isolated signal(s) M(n, k), the RES component may act as a pass-through filter and pass the isolated signal(s) M(n, k) with minor attenuation and/or without any attenuation, although the disclosure is not limited thereto. This avoids attenuating the near-end speech s(t). While not illustrated in FIG. 1, in some examples the device 110 may include a double-talk detector configured to determine when near-end speech and/or far-end speech is present in the isolated signal(s) M(n, k).

Residual echo suppression (RES) processing is performed by selectively attenuating, based on individual frequency bands, an isolated audio signal M(n, k) output by the AEC component 122 to generate the first audio signal. For example, performing RES processing may determine a gain for a portion of the isolated audio signal M(n, k) corresponding to a specific frequency band (e.g., 100 Hz to 200 Hz) and may attenuate the portion of the isolated audio signal M(n, k) based on the gain to generate a portion of the first audio signal corresponding to the specific frequency band. Thus, a gain may be determined for each frequency band and therefore the amount of attenuation may vary based on the frequency band.

The device 110 may determine the gain based on an attenuation value. For example, a low attenuation value $\alpha_1$ (e.g., closer to a value of zero) results in a gain that is closer to a value of one and therefore an amount of attenuation is relatively low. In some examples, the RES component may operate similar to a pass-through filter for low frequency bands, although the disclosure is not limited thereto. An energy level of the first audio signal is therefore similar to an energy level of the isolated audio signal M(n, k). In contrast, a high attenuation value $\alpha_2$ (e.g., closer to a value of one) results in a gain that is closer to a value of zero and therefore an amount of attenuation is relatively high. In some examples, the RES component may attenuate high frequency bands, such that an energy level of the first audio signal is lower than an energy level of the isolated audio signal M(n, k), although the disclosure is not limited thereto. In these examples, the energy level of the first audio signal corresponding to the high frequency bands is lower than the energy level of the first audio signal corresponding to the low frequency bands.

Room reverberation and additive noise are detrimental factors that may negatively impact audio quality. For example, a user 10 of the device 110 may establish a communication session with another device, where digitized speech signals are compressed, packetized, and transmitted via the network(s) 199. One technique for establishing the communication session involves Voice over Internet Protocol (VOIP), although the disclosure is not limited thereto. During the communication session, a large amount of reverberation or additive noise is harmful to communication (e.g., reduces an audio quality), as the reverberation lowers intelligibility and makes the speech sound "far" and "hollow."

To further improve the audio quality of the output signal, the transmit-side processing 124 may include a deep neural network (DNN) configured to process isolated audio data output by the AEC component 122. In some examples, the DNN may be configured to perform speech enhancement. For example, the DNN may process the isolated signals M(n, k) to jointly mitigate additive noise and reverberation, as described in greater detail below with regard to FIGS. 3B, 4A, and 5A. In other examples, the DNN may be configured to perform acoustic interference cancellation, which may remove the need to perform residual echo suppression. For example, the DNN may process the isolated signals M(n, k) and estimated echo data generated by the AEC component 122 to jointly mitigate additive noise, reverberation, and residual echo, as described in greater detail below with regard to FIGS. 3C, 4B, and 5B. As described in greater detail below, the DNN may be configured to process complex-valued spectrograms corresponding to the isolated audio data and/or estimated echo data generated by the AEC component 122.

As illustrated in FIG. 1, the device 110 may generate (140), using the loudspeaker(s) 114, playback audio based on first audio data (e.g., far-end reference signal(s)), may receive (142), from the microphone(s) 112, second audio data (e.g., microphone signals) representing the playback audio and near-end speech, and may perform (144) echo cancellation to generate third audio data (e.g., isolated signal(s)) and echo estimate data.

To illustrate an example, the AEC component 122 may perform AEC processing on the first microphone signal $Z_1(n, k)$ to generate a first isolated signal $M_1(n, k)$ associated with the first microphone 112a. For example, the AEC component 122 may generate a first echo estimate signal using a portion of the far-end reference signal(s) X(n, k), such that the first echo estimate signal approximates an echo signal corresponding to the far-end reference signal(s) that is represented in the first microphone signal. The AEC component 122 may then remove the first echo estimate signal from the first microphone signal $Z_1(n, k)$ to generate the first isolated signal $M_1(n, k)$.

As illustrated in FIG. 1, the device 110 may perform different steps depending on whether the DNN is configured to perform speech enhancement or acoustic interference cancellation. For example, if the DNN is configured to perform speech enhancement prior to a RES component that is configured to perform residual echo suppression, the device 110 may perform steps 148-150, whereas if the DNN is configured to perform acoustic interference cancellation and the device 110 does not include a RES component, the device may perform step 152. Thus, step 146 is illustrated in FIG. 1 but is an implicit step performed by the device 110.

If the transmit-side processing 124 includes a DNN-SE configured to perform speech enhancement, the device 110 may process (148) the third audio data using a trained model (e.g., DNN-SE) to generate fourth audio data, as described in greater detail below with regard to FIGS. 3B, 4A, and 5A. After generating the fourth audio data, the device 110 may perform (150) residual echo suppression processing using the fourth audio data and the echo estimate data to generate processed data.

If the transmit-side processing 124 includes a DNN-AIC configured to attenuate residual echo in addition to performing speech enhancement, the device 110 may process (152) the third audio data and the echo estimate data using a trained model (e.g., DNN-AIC) to generate the processed data, as described in greater detail below with regard to FIGS. 3C, 4B, and 5B.

Finally, the device 110 may generate (154) output audio data using the processed data. For example, the transmit-side processing 124 may perform additional processing to the processed data to generate the output signal OUT(n, k).

In some examples, the processed data may correspond to complex spectrogram data without departing from the disclosure. For example, the device 110 may process the third audio data using the trained model to generate complex spectrogram data, and the device 110 may further process the complex spectrogram data before generating the output audio data in the time domain (e.g., by performing overlap and add filtering and/or the like). However, the disclosure is not limited thereto, and in other examples the processed data may correspond to processed audio data without departing from the disclosure. For example, the device 110 may process the third audio data using the trained model to generate speech mask data, and the device 110 may then use the speech mask data to generate the processed audio data in the time domain without departing from the disclosure.

In some examples, the device 110 may operate using a microphone array comprising multiple microphones 112. For example, the device 110 may use three or more microphones 112 without departing from the disclosure. In some examples, the device 110 may select microphone pairs from a plurality of microphones 112 without departing from the disclosure. Additionally or alternatively, the device 110 may apply beamforming to generate a plurality of directional audio signals (e.g., beams) without departing from the disclosure. In audio systems, beamforming refers to techniques that are used to isolate audio from a particular direction in a multi-directional audio capture system. Beamforming may be particularly useful when filtering out noise from non-desired directions. Beamforming may be used for various tasks, including isolating voice commands to be executed by a speech-processing system.

One technique for beamforming involves boosting audio received from a desired direction while dampening audio received from a non-desired direction. In one example of a beamformer system, a fixed beamformer unit employs a filter-and-sum structure to boost an audio signal that originates from the desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer unit may also incorporate an adaptive beamformer unit/noise canceller that can adaptively cancel noise from different directions depending on audio conditions.

As an alternative to performing acoustic echo cancellation using the far-end reference signal(s) X(n, k), in some examples the device 110 may generate a reference signal based on the beamforming. For example, the device 110 may use Adaptive Reference Algorithm (ARA) processing to generate an adaptive reference signal based on the microphone signal(s) Z(n, k). To illustrate an example, the ARA processing may perform beamforming using the microphone signal(s) Z(n, k) to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform Adaptive Interference Cancellation (AIC) (e.g., adaptive acoustic interference cancellation) by removing the reference signal from the target signal. As the input audio data is not limited to the echo signal, the ARA processing may remove other acoustic noise represented in the input audio data in addition to removing the echo. Therefore, the ARA processing may be referred to as performing AIC, adaptive noise cancellation (ANC), AEC, and/or the like without departing from the disclosure.

In some examples, the device 110 may be configured to perform AIC using the ARA processing to isolate the speech in the microphone signal(s) Z(n, k). The device 110 may dynamically select target signal(s) and/or reference signal(s). Thus, the target signal(s) and/or the reference signal(s) may be continually changing over time based on speech, acoustic noise(s), ambient noise(s), and/or the like in an environment around the device 110. In some examples, the device 110 may select the target signal(s) based on signal quality metrics (e.g., signal-to-interference ratio (SIR) values, signal-to-noise ratio (SNR) values, average power values, etc.) differently based on current system conditions. For example, the device 110 may select target signal(s) having highest signal quality metrics during near-end single-talk conditions (e.g., to increase an amount of energy included in the target signal(s)), but select the target signal(s) having lowest signal quality metrics during far-end single-talk conditions (e.g., to decrease an amount of energy included in the target signal(s)).

In some examples, the device 110 may perform AIC processing without performing beamforming without departing from the disclosure. Instead, the device 110 may select target signals and/or reference signals from the microphone signal(s) Z(n, k) without performing beamforming. For example, a first microphone 112*a* may be positioned in proximity to the loudspeaker(s) 114 or other sources of acoustic noise while a second microphone 112*b* may be positioned in proximity to the user 10. Thus, the device 110 may select first microphone signal $Z_1$(n, k) associated with the first microphone 112*a* as the reference signal and may select second microphone signal $Z_2$(n, k) associated with the second microphone 112*b* as the target signal without departing from the disclosure. Additionally or alternatively, the device 110 may select the target signals and/or the reference signals from a combination of the beamformed audio data and the microphone signal(s) Z(n, k) without departing from the disclosure.

While FIG. 1 illustrates the loudspeaker(s) 114 being internal to the device 110, the disclosure is not limited thereto and the loudspeaker(s) 114 may be external to the device 110 without departing from the disclosure. For example, the device 110 may send the far-end reference signal(s) x(t) to the loudspeaker(s) 114 using a wireless protocol without departing from the disclosure. However, the disclosure is not limited thereto and the loudspeaker(s) 114 may be included in the device 110 and/or connected via a wired connection without departing from the disclosure. For example, the loudspeaker(s) 114 may correspond to a wireless loudspeaker, a television, an audio system, and/or the like connected to the device 110 using a wireless and/or wired connection without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., far-end reference audio data or playback audio data, microphone audio data, near-end reference data or input audio data, etc.) or audio signals (e.g., playback signal, far-end reference signal, microphone signal, near-end reference signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

As used herein, audio signals or audio data (e.g., far-end reference audio data, near-end reference audio data, microphone audio data, or the like) may correspond to a specific range of frequency bands. For example, far-end reference audio data and/or near-end reference audio data may correspond to a human hearing range (e.g., 20 Hz-20 kHz), although the disclosure is not limited thereto.

Far-end reference audio data (e.g., far-end reference signal(s) x(t)) corresponds to audio data that will be output by the loudspeaker(s) 114 to generate playback audio (e.g., echo signal y(t)). For example, the device 110 may stream music or output speech associated with a communication session (e.g., audio or video telecommunication). In some examples, the far-end reference audio data may be referred to as playback audio data, loudspeaker audio data, and/or the like without departing from the disclosure. For ease of illustration, the following description will refer to the playback audio data as far-end reference audio data. As noted above, the far-end reference audio data may be referred to as far-end reference signal(s) x(t) without departing from the disclosure. As described above, the far-end reference signal(s) may be represented in a time domain (e.g., x(t)) or a frequency/subband domain (e.g., X(n, k)) without departing from the disclosure.

Microphone audio data corresponds to audio data that is captured by the microphone(s) 112 prior to the device 110 performing audio processing such as AIC processing. The microphone audio data may include local speech s(t) (e.g., an utterance, such as near-end speech generated by the user 10), an "echo" signal y(t) (e.g., portion of the playback audio captured by the microphone(s) 112), acoustic noise n(t) (e.g., ambient noise in an environment around the device 110), and/or the like. As the microphone audio data is captured by the microphone(s) 112 and captures audio input to the device 110, the microphone audio data may be referred to as input audio data, near-end audio data, and/or the like without departing from the disclosure. For ease of illustration, the following description will refer to microphone audio data and near-end reference audio data interchangeably. As noted above, the near-end reference audio data/microphone audio data may be referred to as a near-end reference signal(s) or microphone signal(s) without departing from the disclosure. As described above, the microphone signals may be represented in a time domain (e.g., z(t)) or a frequency/subband domain (e.g., Z(n, k)) without departing from the disclosure.

An "echo" signal y(t) corresponds to a portion of the playback audio that reaches the microphone(s) 112 (e.g., portion of audible sound(s) output by the loudspeaker(s) 114 that is recaptured by the microphone(s) 112) and may be referred to as an echo or echo data y(t).

Output audio data corresponds to audio data after the device 110 performs audio processing (e.g., AIC processing, ANC processing, AEC processing, and/or the like) to isolate the local speech s(t). For example, the output audio data corresponds to the microphone audio data Z(n, k) after subtracting the reference signal(s) X(n, k) (e.g., using AEC component 122), optionally performing residual echo suppression (RES) (e.g., using the RES component), and/or other audio processing known to one of skill in the art. As noted above, the output audio data may be referred to as output audio signal(s) without departing from the disclosure. As described above, the output signal may be represented in a time domain (e.g., out(t)) or a frequency/subband domain (e.g., OUT(n, k)) without departing from the disclosure.

As illustrated in FIG. 1, the output of the AEC component may be represented as M(n, k) and may be referred to as isolated audio signal M(n, k), error audio data M(n, k), error signal M(n, k), and/or the like. Similarly, the output of the transmit side processing component(s) 124 may be represented as OUT(n, k) and may be referred to as an output signal OUT(n, k).

For ease of illustration, the following description may refer to generating the output audio data by performing acoustic echo cancellation (AEC) processing, residual echo suppression (RES) processing, noise reduction (NR) processing, comfort noise generation (CNG) processing, dereverberation (DER) processing, and/or the like. However, the disclosure is not limited thereto, and the device 110 may generate the output audio data by performing AEC processing, AIC processing, RES processing, NR processing, CNG processing, DER processing, other audio processing, and/or a combination thereof without departing from the disclosure. Additionally or alternatively, the disclosure is not limited to AEC processing and, in addition to or instead of performing AEC processing, the device 110 may perform other processing to remove or reduce unwanted speech $s_2(t)$ (e.g., speech associated with a second user), unwanted acoustic noise n(t), and/or echo signals y(t), such as adaptive interference cancellation (AIC) processing, adaptive noise cancellation (ANC) processing, and/or the like without departing from the disclosure.

Figure 2B:
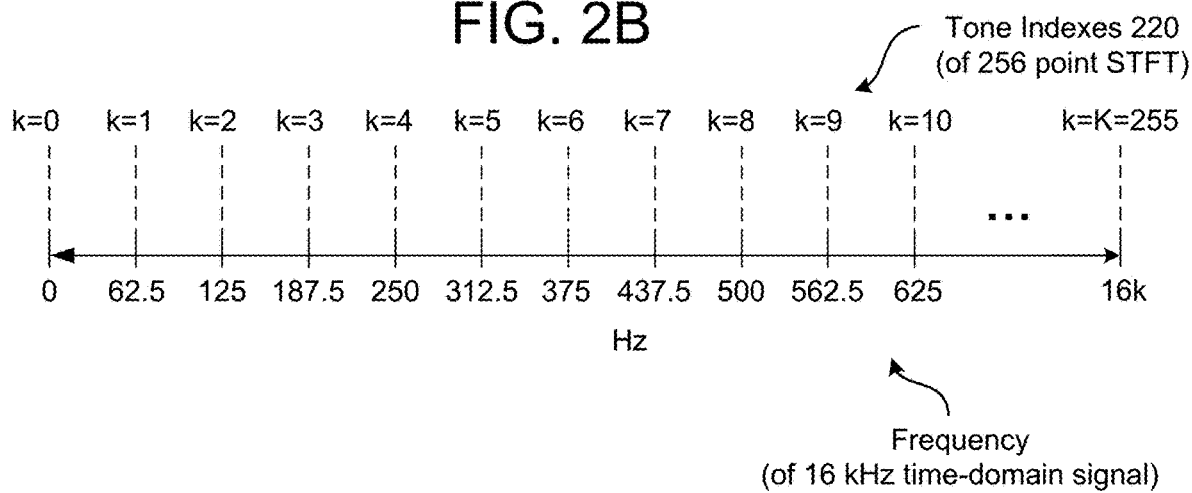
Figure 2C:
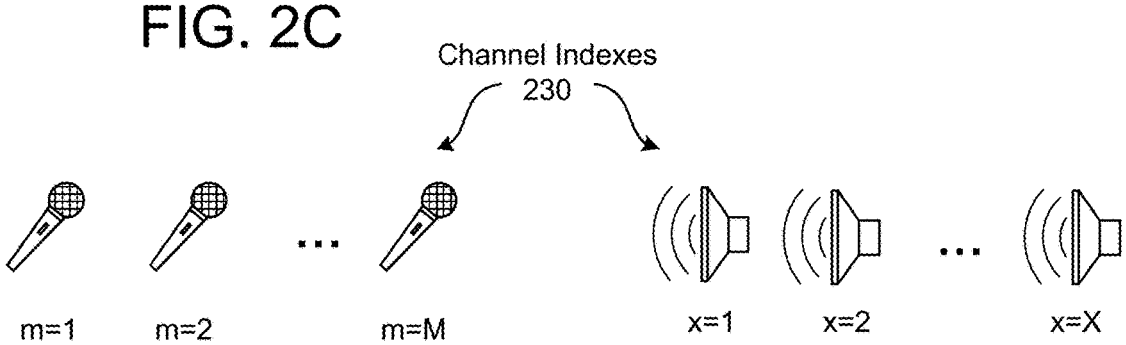

FIGS. 2A-2C illustrate examples of frame indexes, tone indexes, and channel indexes. As described above, the device 110 may generate microphone audio data z(t) using microphones 112. For example, a first microphone 112a may generate first microphone audio data $z_1(t)$ in a time domain, a second microphone 112b may generate second microphone audio data $z_2(t)$ in the time domain, and so on. As illustrated in FIG. 2A, a time domain signal may be represented as microphone audio data z(t) 210, which is comprised of a sequence of individual samples of audio data. Thus, z(t) denotes an individual sample that is associated with a time t.

While the microphone audio data z(t) 210 is comprised of a plurality of samples, in some examples the device 110 may group a plurality of samples and process them together. As illustrated in FIG. 2A, the device 110 may group a number of samples together in a frame (e.g., audio frame) to generate microphone audio data z(n) 212. As used herein, a variable z(n) corresponds to the time-domain signal and identifies an individual frame (e.g., fixed number of samples s) associated with a frame index n.

Additionally or alternatively, the device 110 may convert microphone audio data z(n) 212 from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) 214 in the frequency domain or the subband domain. As used herein, a variable Z(n, k) corresponds to the frequency-domain signal and identifies an individual frame associated with frame index n and tone index k. As illustrated in FIG. 2A, the microphone audio data z(t) 210 corresponds to time indexes 216, whereas the microphone audio data z(n) 212 and the microphone audio data Z(n, k) 214 corresponds to frame indexes 218.

While FIG. 2A illustrates examples of the device 110 converting between microphone audio data z(t) 210 (e.g., time domain signal comprising individual samples), microphone audio data z(n) 212 (e.g., time domain signal comprising audio frames), and microphone audio data Z(n, k) 214 (e.g., frequency domain or subband domain signal), the disclosure is not limited thereto and these concepts may be applied to other audio signals without departing from the disclosure. For example, the device 110 may convert between reference audio data x(t) (e.g., time domain signal comprising individual samples), reference audio data x(n) (e.g., time domain signal comprising audio frames), and reference audio data X(n, k) (e.g., frequency domain or subband domain signal) without departing from the disclosure. Similarly, the device 110 may generate an output signal OUT(n, k) in the frequency or subband domain and then convert to the time domain to generate output signal out(n) or out(t) without departing from the disclosure.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data z(t) 210) and frame indexes 218 (e.g., microphone audio data z(n) 212 in the time domain and microphone audio data Z(n, k) 216 in the frequency domain or subband domain). For example, the system 100 may apply FFT processing to the time-domain microphone audio data z(n) 212, producing the frequency-domain microphone audio data Z(n,k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 62.5 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different subbands (e.g., tone indexes), the disclosure is not limited thereto and the system 100 may divide the frequency range into K different subbands or frequency bins (e.g., K indicates an FFT size) without departing from the disclosure. While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

The system 100 may include multiple microphones 112, with a first channel (m=1) corresponding to a first microphone 112a, a second channel (m=2) corresponding to a second microphone 112b, and so on until an M-th channel (m=M) that corresponds to microphone 112M. FIG. 2C illustrates channel indexes 230 including a plurality of channels from channel m1 to channel M. While many drawings illustrate two channels (e.g., two microphones 112), the disclosure is not limited thereto and the number of channels may vary. For the purposes of discussion, an example of system 100 includes "M" microphones 112 (M>1) for hands free near-end/far-end distant speech recognition applications.

Similarly, the system 100 may include multiple loudspeakers 114, with a first channel (x=1) corresponding to a first loudspeaker 114a, a second channel (x=2) corresponding to a second loudspeaker 114b, and so on until an X-th channel (x=X) that corresponds to loudspeaker 114X. FIG. 2C illustrates channel indexes 230 also including a plurality of reference channels from channel x1 to channel X. For ease of illustration, the following disclosure may refer to a single reference channel, but the disclosure is not limited thereto and the system 100 may modify the techniques described herein based on any number of reference channels without departing from the disclosure.

As described above, while FIG. 2A is described with reference to the microphone audio data z(t), the disclosure is not limited thereto and the same techniques apply to the playback audio data x(t) without departing from the disclosure. Thus, playback audio data x(t) indicates a specific time index/from a series of samples in the time-domain, playback audio data x(n) indicates a specific frame index n from series of frames in the time-domain, and playback audio data X(n, k) indicates a specific frame index n and frequency index k from a series of frames in the frequency-domain.

Prior to converting the microphone audio data z(n) and the playback audio data x(n) to the frequency-domain, the device 110 may first perform time-alignment to align the playback audio data x(n) with the microphone audio data z(n). For example, due to nonlinearities and variable delays associated with sending the playback audio data x(n) to the loudspeaker(s) 114 (e.g., especially if using a wireless connection), the playback audio data x(n) is not synchronized with the microphone audio data z(n). This lack of synchronization may be due to a propagation delay (e.g., fixed time delay) between the playback audio data x(n) and the microphone audio data z(n), clock jitter and/or clock skew (e.g., difference in sampling frequencies between the device 110 and the loudspeaker(s) 114), dropped packets (e.g., missing samples), and/or other variable delays.

To perform the time alignment, the device 110 may adjust the playback audio data x(n) to match the microphone audio data z(n). For example, the device 110 may adjust an offset between the playback audio data x(n) and the microphone audio data z(n) (e.g., adjust for propagation delay), may add/subtract samples and/or frames from the playback audio data x(n) (e.g., adjust for drift), and/or the like. In some examples, the device 110 may modify both the microphone audio data and the playback audio data in order to synchronize the microphone audio data and the playback audio data. However, performing nonlinear modifications to the microphone audio data results in first microphone audio data associated with a first microphone to no longer be synchronized with second microphone audio data associated with a second microphone. Thus, the device 110 may instead modify only the playback audio data so that the playback audio data is synchronized with the first microphone audio data.

As described above, room reverberation and additive noise are detrimental factors that negatively impact audio quality for hands-free voice communication systems. For example, a user 10 of a local device 110 may establish a communication session with another device, where digitized speech signals are compressed, packetized, and transmitted via the network(s) 199. One technique for establishing the communication session involves Voice over Internet Protocol (VOIP), although the disclosure is not limited thereto. During the communication session, a large amount of additive noise and/or reverberation is harmful to communication (e.g., reduces an audio quality), as the reverberation lowers intelligibility and makes the speech sound "far" and "hollow."

FIG. 3A illustrates example components of a conventional voice processing pipeline. As illustrated in FIG. 3A, during conventional signal processing 300 the device 110 may generate microphone audio data 302 using one or more microphones 112 and may perform signal processing to the microphone audio data 302 in order to generate output audio data 335. For example, FIG. 3A illustrates an example in which the device 110 may include an acoustic echo cancellation (AEC) component 310, a residual echo suppression (RES) and noise reduction (NR) component 320, a comfort noise generator (CNG) component 330, and/or additional components that may be configured to perform the conventional signal processing 300 to generate the output audio data 335, although the disclosure is not limited thereto.

While not illustrated in FIG. 3A, in some examples the device 110 may perform signal processing in a subband domain and/or frequency domain without departing from the disclosure. For example, a first analysis filterbank (not shown) may convert the microphone audio data 302 from the time domain (e.g., $z_0(n)$) to the subband domain (e.g., $Z_0(n,k)$), where n is the frame index, k=0 to N/2 is the frequency index, and N is the number of subbands. As described above, the microphone audio data 302 may include multiple channels corresponding to individual microphones 112 without departing from the disclosure. In some examples, the first analysis filterbank may be configured to convert each channel of the microphone audio data 302 from the time domain to the subband domain without departing from the disclosure. However, the disclosure is not limited thereto, and in other examples the device 110 may include a separate analysis filterbank for each individual microphone without departing from the disclosure. For example, the device 110 may include a second analysis filterbank configured to convert a second microphone signal of the microphone audio data 302 from the time domain (e.g., $z_1(n)$) to the subband domain (e.g., $Z_1(n,k)$), and so on.

Additionally or alternatively, the device 110 may include a third analysis filterbank configured to convert reference audio data 304 from the time domain (e.g., x(n)) to the subband domain (e.g., X(n,k)). In some examples, the third analysis filterbank may include a uniform discrete Fourier transform (DFT) filterbank to convert the reference audio data 304 from the time domain into the sub-band domain (e.g., converting to the frequency domain and then separating different frequency ranges into a plurality of individual sub-bands). Therefore, the audio signal X may incorporate reference audio signals corresponding to one or more loudspeakers 114 as well as different sub-bands (i.e., frequency ranges) as well as different frame indices (i.e., time ranges). Thus, the audio signal associated with the xth loudspeaker 114 may be represented as $X_x(n, k)$, where n denotes the frame index and k denotes the sub-band index.

As illustrated in FIG. 3A, the AEC component 122 may perform echo cancellation (e.g., AEC processing) to generate echo estimate data 312 and AEC output data 314, which may be referred to as isolated audio data. For example, the AEC component 122 may generate an echo estimate Y'(n, k) using the reference signal X(n,k) and may subtract the echo estimate Y'(n, k) from the first microphone signal $Z_0(n,k)$ to generate first isolated signal $M_0(n, k)$. If the echo estimate Y'(n, k) corresponds to the echo signal Y(n, k) represented in the first microphone signal $Z_0(n,k)$, the AEC component 122 may effectively remove the echo signal Y(n, k) and isolate the near-end speech S(n, k). The AEC component 122 may output the echo estimate data 312 and/or the AEC output data 314 (e.g., first isolated signal $M_0(n, k)$) to a Residual Echo Suppression (RES) and Noise Reduction (NR) component 320.

The RES+NR component 320 may perform residual echo suppression (RES) processing and/or Noise Reduction (NR) processing to the AEC output data 314 to generate processed audio data 325. For example, the RES+NR component 320 may perform RES processing in order to suppress echo signals (or undesired audio) remaining in the first isolated signal $M_0(n, k)$ to generate a first audio signal RRES(n, k). In some examples, the RES+NR component 320 may calculate RES gains (not illustrated) based on the echo estimate data 312 in order to apply additional attenuation. To illustrate an example, the RES+NR component 320 may use the echo estimate data 312 and/or the AEC output data 314 to identify first subbands in which the AEC component 122 applied attenuation. The RES+NR component 320 may then determine whether there are residual echo components represented in the first subbands of the first isolated signal $M_0(n, k)$ and may calculate the RES gains to perform residual echo suppression processing. For example, the RES+NR component 320 may apply the RES gains to the first isolated signal $M_0(n, k)$ in order to generate the first audio signal RRES(n, k).

In some examples, the RES+NR component 320 may vary an amount of RES processing based on current conditions, although the disclosure is not limited thereto. Additionally or alternatively, the RES+NR component 320 may perform RES processing differently based on individual frequency indexes. For example, the RES+NR component 320 may control an amount of gain applied to low frequency bands, which are commonly associated with speech.

In addition to performing RES processing, the RES+NR component 320 may also perform noise reduction processing without departing from the disclosure. For example, the RES+NR component 320 may determine a noise estimate and perform NR processing to generate the first audio signal RRES(n, k) based on the noise estimate. In some examples, the RES+NR component 320 may perform RES processing and NR processing as two separate steps, such that the RES+NR component 320 performs RES processing on the first isolated signal $M_0(n, k)$ to generate a first audio signal R'RES(n, k), and then performs NR processing on the first audio signal R'RES(n, k) to generate the first audio signal RRES(n, k). However, the disclosure is not limited thereto and in other examples the RES+NR component 320 may perform RES processing and NR processing as a single step, such that the RES+NR component 320 performs RES processing and NR processing on the first isolated signal $M_0(n, k)$ to generate the first audio signal RRES(n, k).

While not illustrated in FIG. 3A, the RES+NR component 320 may optionally output the RES gains. For example, the RES+NR component 320 may output the RES gains to an Automatic Gain Control (AGC) component (which may also be referred to as adaptive gain control) that processes the output audio data 335, although the disclosure is not limited thereto. In some examples, the RES gains may correspond to the RES mask data, although the disclosure is not limited thereto.

As illustrated in FIG. 3A, the device 110 may include a comfort noise generator (CNG) component 330 configured to receive the processed audio data 325 and generate output audio data 335. For example, the CNG component 330 may generate a first noise signal NGEN using a comfort noise gain (GCNG) and may apply the first noise signal NGEN to the processed audio data 325 to generate the output audio data 335. The CNG processing is beneficial as it adds a small amount of noise that helps smooth transitions caused by the AEC component 122 and/or the RES+NR component 320 attenuating the signal.

While not illustrated in FIG. 3A, the device 110 may include a synthesis filterbank configured to convert the output audio data 335 from the subband domain (e.g., signal OUT(n, k)) to the time domain (e.g., out(t)). For example, the output signal OUT(n, k) in the subband domain may include a plurality of separate sub-bands (e.g., individual frequency bands) and the synthesis filterbank may combine the plurality of subbands to generate the output signal out(t) in the time domain.

While not illustrated in FIG. 3A, in some examples the device 110 may include an automatic gain control (AGC) component (not illustrated) (which may also be referred to as adaptive gain control) and/or a dynamic range compression (DRC) component (not illustrated) (which may also be referred to as dynamic range control) to generate the output signal without departing from the disclosure. The device 110 may apply the AGC processing and/or the DRC processing using any techniques known to one of skill in the art. In some examples, the device 110 may perform additional processing in the time domain using the RES gain values, although the disclosure is not limited thereto. For example, the device 110 may use the RES gain values to estimate an amount of noise represented in the output signal and perform additional processing based on the estimated amount of noise.

Figure 3B:
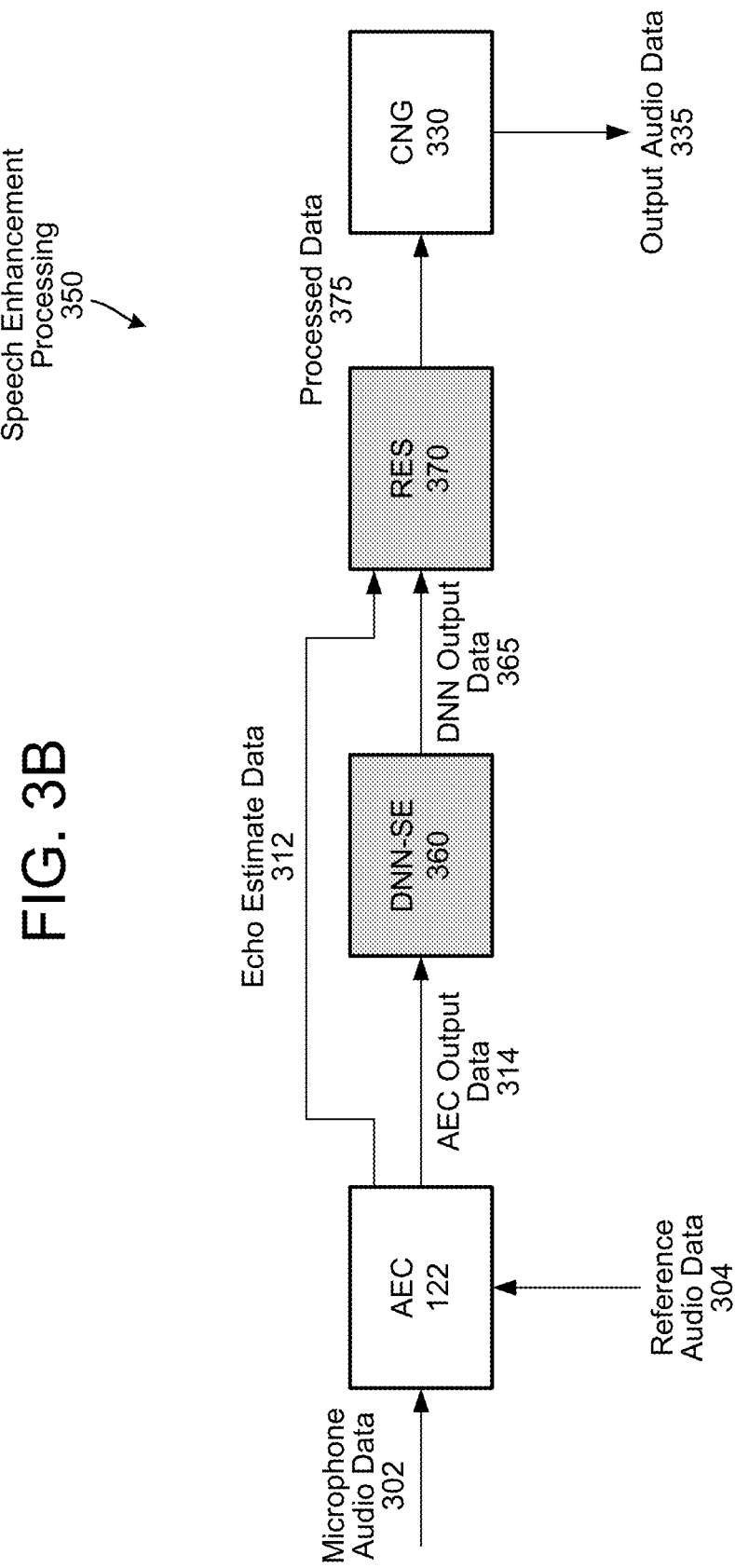
FIGS. 3B-3C illustrate example components for performing dereverberation and noise reduction within a voice processing pipeline according to examples of the present disclosure.
Figure 3C:
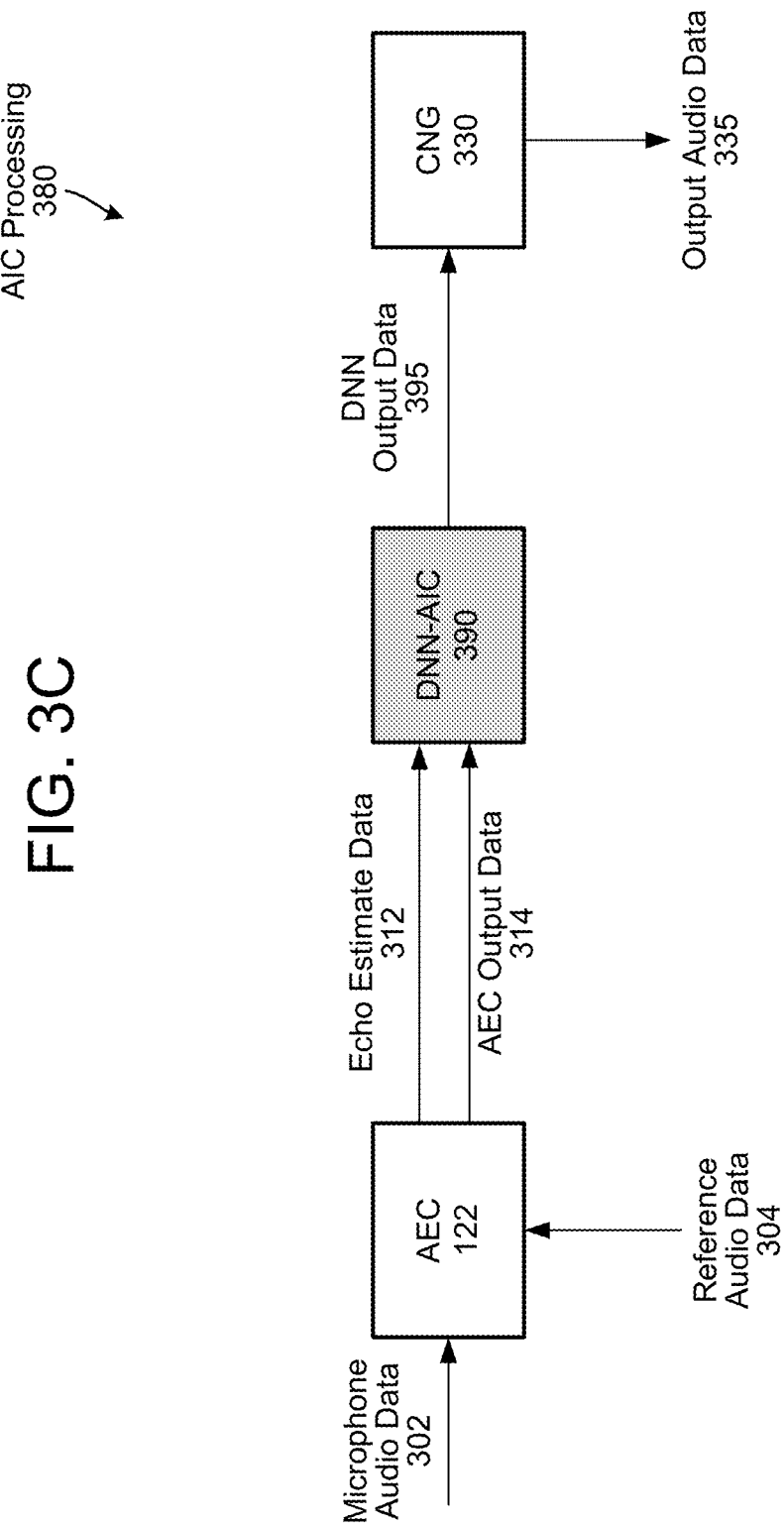

FIGS. 3B-3C illustrate example components for performing dereverberation and noise reduction within a voice processing pipeline according to examples of the present disclosure. As illustrated in FIG. 3B, in some examples the system 100 may perform speech enhancement processing 350 by including a speech enhancement deep neural network (DNN-SE) component 360 after the AEC component 122. For example, the DNN-SE component 360 may be configured to process the AEC output data 314 to jointly mitigate additive noise and reverberation and generate DNN output data 365. As the DNN-SE component 360 is configured to perform noise reduction, the RES+NR component 320 illustrated in FIG. 3A may be replaced with a RES component 370 that is configured to perform RES processing to generate processed data 375. As illustrated in FIG. 3B, the AEC component 122 may output the echo estimate data 312 to the RES component 370, bypassing the DNN-SE component 360 entirely. While not illustrated in FIG. 3B, the device 110 may include a delay component configured to delay the echo estimate data 312 prior to the RES component 370 without departing from the disclosure.

In contrast, FIG. 3C illustrates that in other examples the system 100 may perform acoustic interference cancellation (AIC) processing 380 by including an AIC deep neural network (DNN-AIC) component 390 after the AEC component 122. For example, the DNN-AIC component 390 may be configured to process the AEC output data 314 to jointly mitigate additive noise, reverberation, and residual echo in order to generate DNN output data 395. As the DNN-AIC component 390 is configured to mitigate the residual echo, the AIC processing 380 does not include the RES+NR component 320 or the RES component 370. Instead, the DNN-AIC component 390 outputs the DNN output data 395 directly to the CNG component 330, although the disclosure is not limited thereto.

While FIG. 3C illustrates an example in which the DNN-AIC component 390 processes the echo estimate data 312 and the AEC output data 314 and outputs the DNN output data 395 to the CNG component 330, the disclosure is not limited thereto. In some examples, AIC processing 380 may include the RES component 370 and/or the like, which may be configured to receive the DNN output data 395 and perform residual echo suppression. For example, the RES component 370 may perform basic RES processing to generate the processed data 375 and may input the processed data 375 to the CNG component 330, although the disclosure is not limited thereto.

Figure 4A:
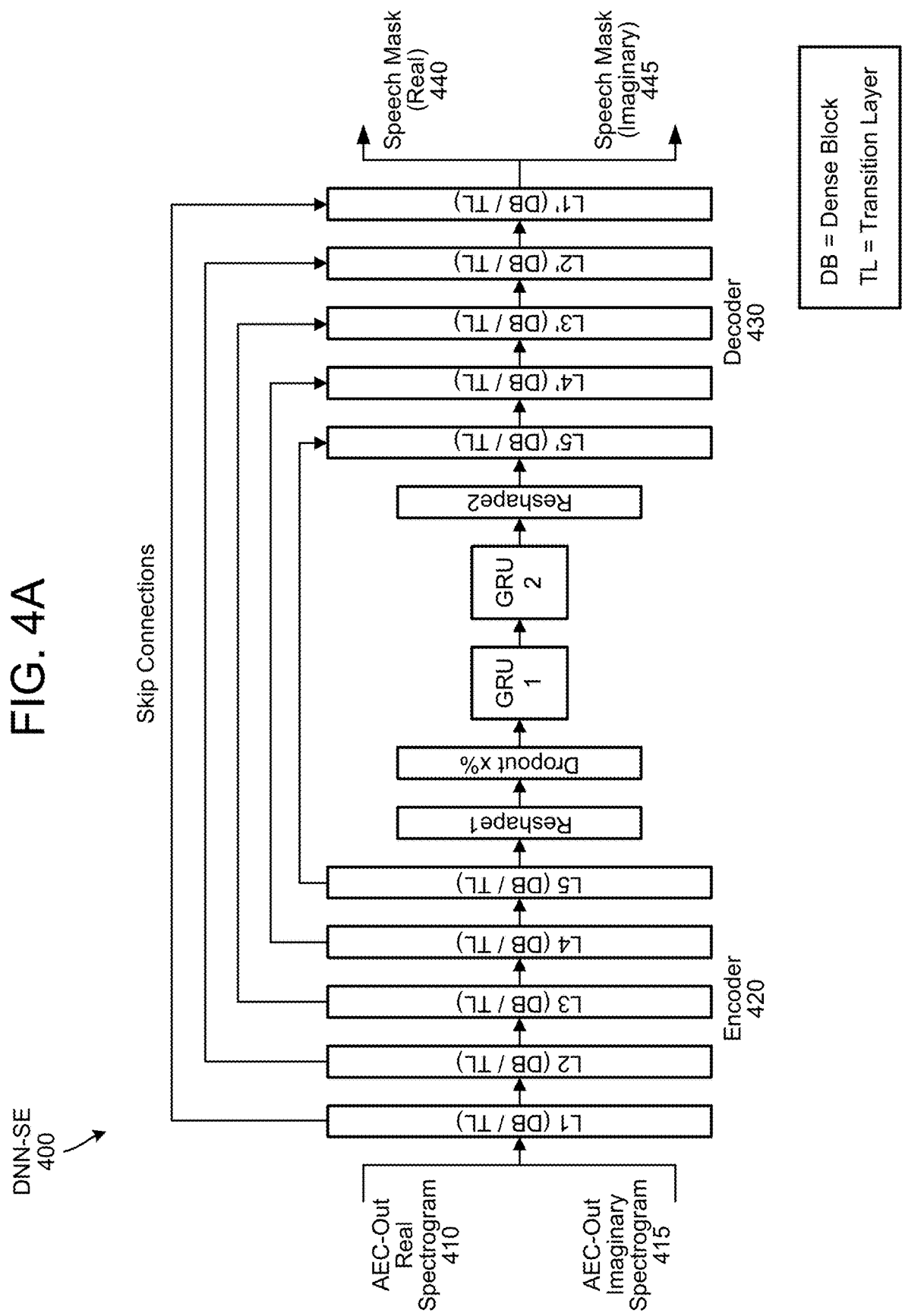
FIGS. 4A-4B illustrate example architecture diagrams for performing dereverberation and noise reduction within a voice processing pipeline according to examples of the present disclosure.
Figure 4B:
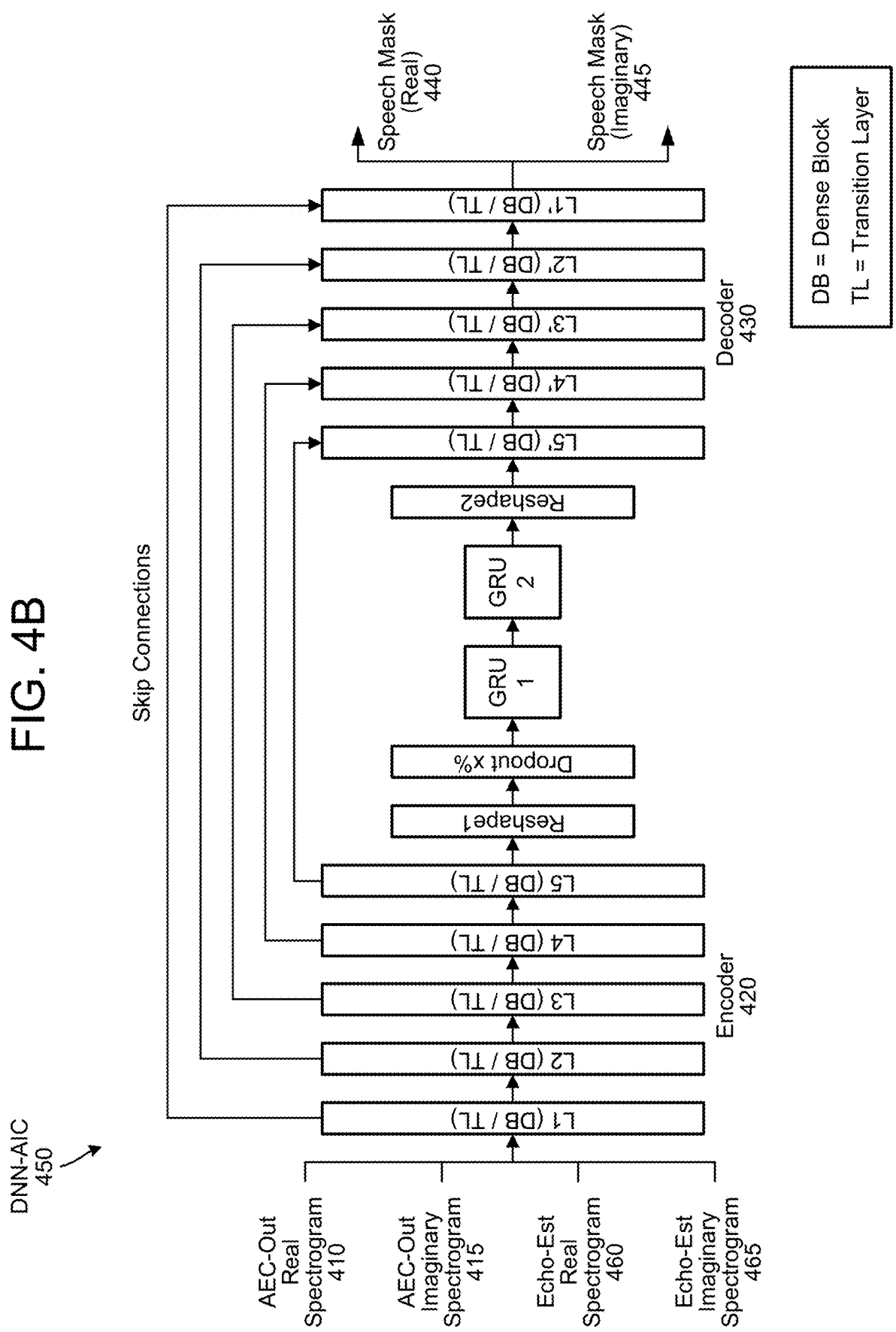

FIGS. 4A-4B illustrate example architecture diagrams for performing dereverberation and noise reduction within a voice processing pipeline according to examples of the present disclosure. As illustrated in FIG. 4A, a DNN-SE component 400 may use an encoder-decoder structure, with skip connections connecting layers in an encoder 420 with corresponding layers in a decoder 430. The input to the encoder 420 is a complex-valued spectrogram of the AEC output data 314 and the output of the decoder 430 is a complex-valued mask that retains most of the speech while suppressing and/or attenuating the additive noise components. For example, the device 110 may generate an AEC-Out real spectrogram 410 and an AEC-Out imaginary spectrogram 415, which may be input to the encoder 420 as separate input channels.

As illustrated in FIG. 4A, the encoder 420 may include five stacked dense convolutional layers, followed by a reshape layer and a dropout layer, although the disclosure is not limited thereto. An individual convolutional layer may include a dense block followed by a transition layer, as described in greater detail below with regard to FIG. 5. For example, at the end of each dense layer, a transition layer controls the number of feature maps propagating from one dense block to another and also applies downsampling and upsampling of the feature maps in the encoder 420 and decoder 430, respectively. The dropout layer is included in order to apply regularization to the DNN modeling.

The DNN-SE 400 includes two gated recurrent units (GRUs) between the encoder 420 and the decoder 430 in order to model the long-term temporal variations. The decoder 430 may mirror the encoder 420 by including a reshape layer and five stacked dense convolutional layers, which perform similar processing as described above with regard to the encoder 420. The output of the decoder 430 is a speech mask (real) 440 representing real components of the speech and a speech mask (imaginary) 445 representing imaginary components of the speech.

As illustrated in FIG. 4B, the DNN-AIC 450 may have the same architecture as the DNN-SE 400 described above. However, the DNN-AIC 450 may be configured to process four input channels, such that the encoder 420 receives an Echo-Est real spectrogram 460 and an Echo-Est imaginary spectrogram 465 in addition to the AEC-Out real spectrogram 410 and the AEC-Out imaginary spectrogram 415. In some examples, the DNN-AIC 450 may receive real and imaginary spectrograms corresponding to the reference audio data 304, although the disclosure is not limited thereto. The output of the DNN-AIC 450 is still the speech mask (real) 440 representing real components of the speech and the speech mask (imaginary) 445 representing imaginary components of the speech.

FIG. 5 illustrates an example structure of a dense block according to embodiments of the present disclosure. As illustrated in FIG. 5, a dense block 500 is composed of stack convolutional layers 520 such that a layer deeper in the stack receives the feature maps of all preceding convolutional layers 520. For example, a first convolution layer 520a receives input data 510 and generates a first output, which is concatenated with the input data 510 to generate a first combined input to a second convolution layer 520b. The second convolution layer 520b processes the first combined input (e.g., concatenation of the input data 510 and the first output) to generate a second output, which is concatenated with the input data 510 and the first output to generate a second combined input to a third convolution layer 520c. The third convolution layer 520c processes the second combined input (e.g., concatenation of the input data 510, the first output, and the second output), and so on until a fifth convolution layer 520e generates output data 530. Thus, the fifth convolution layer 520e generates the output data 530, which includes all of the feature layers of the dense block 500 stacked together.

As continuing this process would result in a huge number of feature layers and increase processing consumption of the device 110, the DNN 400/450 may include a transition layer configured to control the number of feature maps propagating from one dense block 500 to another and also applying downsampling and upsampling of the feature maps in the encoder 420 and decoder 430, respectively. Thus, the DNN 400/450 includes transition layers between each dense block in order to limit how many feature layers are passed between the dense blocks. For example, a first dense convolution layer (L1) of the encoder 420 may include a first dense block 500a and a first transition layer. The first dense block 500a may be configured to generate first output data 530a comprising a first number of feature layers, while the first transition layer may act as a bottleneck layer and generate output data comprising a second number of feature layers. In some examples, the first transition layer may reduce from the first number of feature layers (e.g., 200) to the second number of feature layers (e.g., 40), although the disclosure is not limited thereto and the number of feature layers may vary without departing from the disclosure.

While the dense blocks are a form of deeper tensor, the GRUs work on a time sequence in a single dimension. To enable the GRUs to function properly, the DNN 400/450 may include reshape layers (e.g., Reshape1 and Reshape2) and a dropout layer (e.g., Dropout x %) configured to perform regularization. For example, these layers may be regularization layers configured to flatten the tensor output of the dense blocks to an input that the GRUs are configured to consume.

As illustrated in FIGS. 4A-4B, the DNN 400/450 may include skip connections that connect layers between the encoder 420 and the decoder 430. For example, a fifth dense convolution layer (L5) of the encoder 420 may have a first skip connection to a first dense convolution layer (L5') of the decoder 430, a fourth dense convolution layer (L4) of the encoder 420 may have a second skip connection to a second dense convolution layer (L4') of the decoder 430, and so on. These skip connections are used during training with back propagation, allowing better gradient flow to train the DNN 400/450. Thus, the skip connections enable the DNN 400/450 to update weights properly during back propagation, as without the skip connections the gradient layers vanish and the weights may not be updated properly.

While FIG. 4B illustrates an example in which each dense convolution layer of the encoder 420 receives the combined inputs (e.g., AEC-Out real spectrogram 410, AEC-Out imaginary spectrogram 415, Echo-Est real spectrogram 460, and Echo-Est imaginary spectrogram 465), the disclosure is not limited thereto. In some examples, the DNN-AIC 450 may include separate sets of dense convolution layers, with a first set processing the AEC-Out input (e.g., AEC-Out real spectrogram 410 and AEC-Out imaginary spectrogram 415), and a second set processing the Echo-Est input (e.g., Echo-Est real spectrogram 460 and Echo-Est imaginary spectrogram 465). For example, the first dense convolution layer (L1) could be split in half, with a first portion processing the AEC-Out input and a second portion processing the Echo-Est input. The encoder 420 could continue to separate these inputs for one to three dense convolution layers (e.g., L1, L1-L2, or L1-L3) without departing from the disclosure. For example, the encoder 420 of the DNN-AIC 450 could separate the two input signals for the first three dense convolution layers (e.g., L1-L3), then a third transition layer of the third dense convolution layer (L3) may combine the two sets of feature layers and output the combined feature layers to the fourth dense convolution layer (L4), although the disclosure is not limited thereto. However, the number of dense convolution layers and/or how the feature layers are combined may vary without departing from the disclosure. For example, the DNN-AIC 450 may combine the two sets of feature layers using a transition layer associated with the dense convolution layers, as described above, or the DNN-AIC 450 may include an additional bottleneck layer with an additional skip connection without departing from the disclosure.

While FIGS. 4A-4B illustrate examples in which the DNN 400/450 include five stacked dense convolutional layers, the disclosure is not limited thereto. Instead, the number of convolutional layers may vary without departing from the disclosure. For example, this may be a design parameter and the DNN 400/450 may include fewer convolutional layers or additional convolutional layers without departing from the disclosure. Additionally or alternatively, while FIGS. 4A-4B illustrate examples in which the DNN 400/450 include two GRUs between the encoder 420 and the decoder 430, the disclosure is not limited thereto. Instead, the DNN 400/450 may include any recurrent layers, such as long short-term memory (LSTM) layers and/or the like, without departing from the disclosure.

As illustrated in FIGS. 4A-4B, in some examples the DNN-SE 400 and/or the DNN-AIC 450 may process complex spectrogram data without departing from the disclosure. For example, the device 110 may process the AEC output data 314 to generate the AEC-Out real spectrogram 410 and the AEC-Out imaginary spectrogram 415. Additionally or alternatively, the device 110 may process the echo estimate data 312 to generate the Echo-Est real spectrogram 460 and the Echo-Est imaginary spectrogram 465. Thus, the DNN-SE 400 may process the AEC-Out real spectrogram 410 and the AEC-Out imaginary spectrogram 415, while the DNN-AIC 450 may process the AEC-Out real spectrogram 410, the AEC-Out imaginary spectrogram 415, the Echo-Est real spectrogram 460, and the Echo-Est imaginary spectrogram 465, without departing from the disclosure.

The disclosure is not limited thereto, however, and the DNN-SE 400 and/or the DNN-AIC 450 (e.g., DNN 400/450) may process other complex spectrogram data without departing from the disclosure. For example, the DNN 400/450 may process a phase/magnitude representation of the AEC output data 314 and/or the echo estimate data 312, a single-input magnitude representation of the AEC output data 314 and/or the echo estimate data 312, and/or the like without departing from the disclosure. Additionally or alternatively, the DNN 400/450 may process a time-domain signal without departing from the disclosure. For example, the DNN 400/450 may process the AEC output data 314 and/or the echo estimate data 312 in the time-domain without departing from the disclosure.

As illustrated in FIGS. 4A-4B, the DNN 400/450 may generate speech mask data, such as the speech mask (real) 440 representing real components of the speech and the speech mask (imaginary) 445 representing imaginary components of the speech, without departing from the disclosure. This enables the device 110 to output the speech mask data to additional components for further processing and/or functionality. For example, the DNN 360/390 may output the speech mask data to the RES component 370, the CNG component 330, a voice activity detection (VAD) component (not illustrated), an automatic gain control (AGC) component (not illustrated), and/or other components without departing from the disclosure. In some examples, the speech mask data may be used as an estimate of voice activity detection without performing VAD processing, although the disclosure is not limited thereto.

Figure 6A:
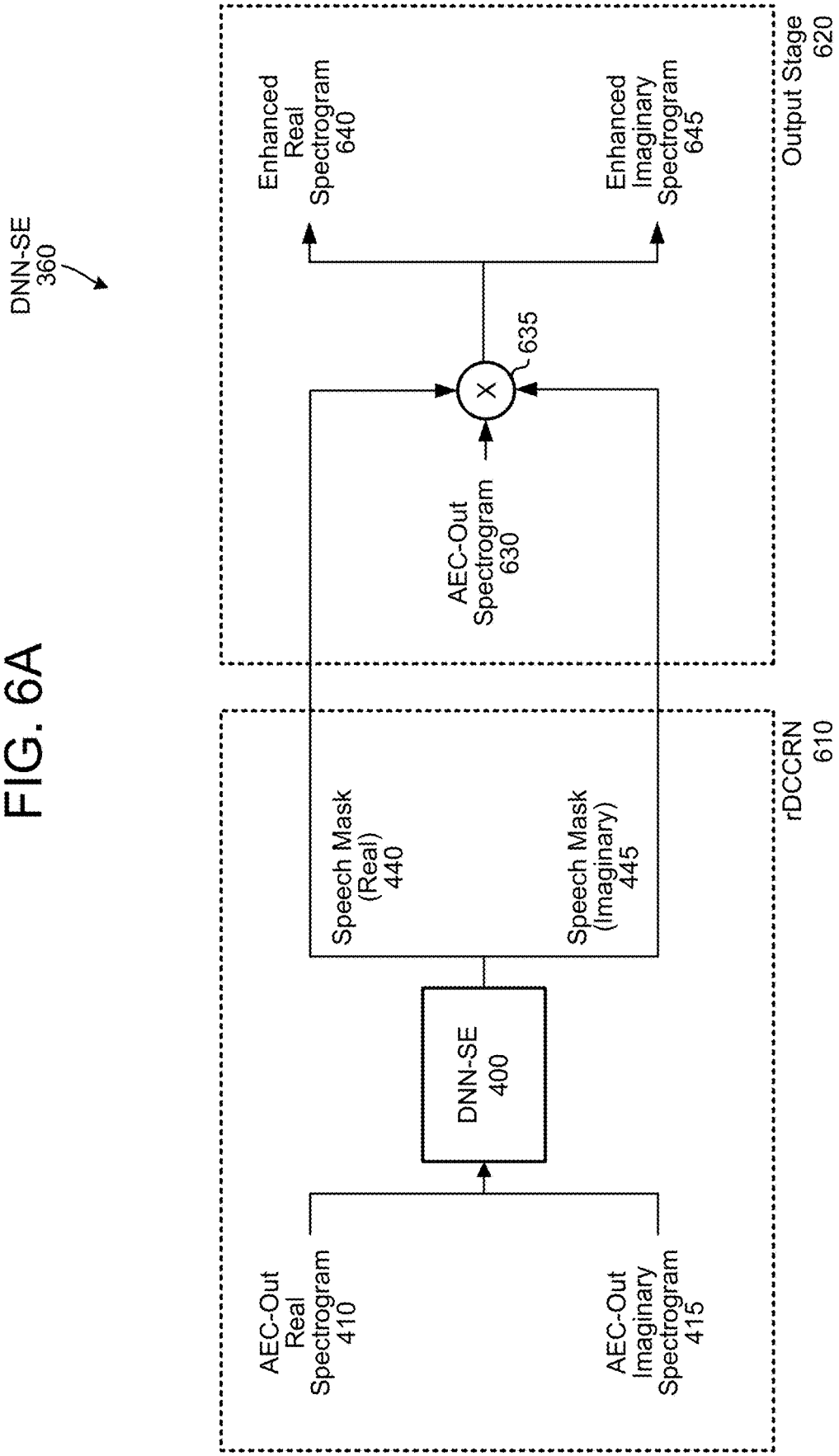
FIGS. 6A-6B illustrate examples of complex convolutional recurrent neural networks according to examples of the present disclosure.
Figure 6B:
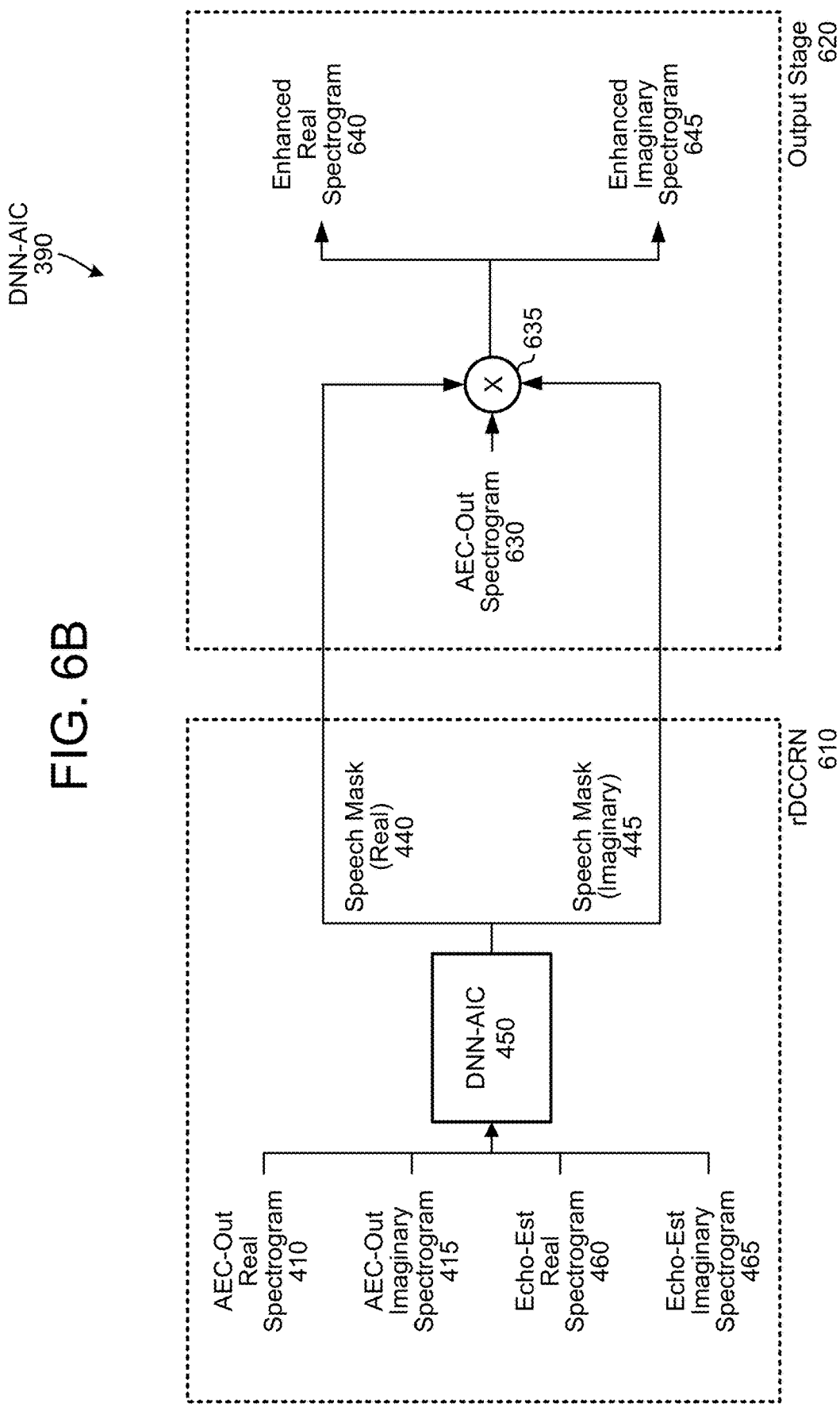

FIGS. 6A-6B illustrate examples of complex convolutional recurrent neural networks according to examples of the present disclosure. When the DNN 400/450 is configured to generate speech mask data, the device 110 may perform additional processing to generate the DNN output data 365/395 illustrated in FIGS. 3B-3C. For example, the DNN component 360/390 may include the DNN 400/450 along with additional components and/or logic configured to process the speech mask data to generate the DNN output data 365/395.

As illustrated in FIG. 6A, in some examples the DNN-SE 360 may include the DNN-SE 400 as part of a robust deep complex convolutional recurrent neural network (rDCCRN) 610. For example, the DNN-SE 400 may process the AEC-Out real spectrogram 410 and the AEC-Out imaginary spectrogram 415 to generate the speech mask (real) 440 and the speech mask (imaginary) 445, as described above with regard to FIG. 4A. In addition, the DNN-SE 360 may include an output stage 620 configured to generate enhanced spectrogram data. For example, the output stage 620 may include a combining (e.g., multiplier) component 635 configured to multiply the speech mask data (e.g., the speech mask (real) 440 and the speech mask (imaginary) 445) with the AEC-Out spectrogram 630 (e.g., the AEC-Out real spectrogram 410 and the AEC-Out imaginary spectrogram 415) to generate the enhanced spectrogram data (e.g., an enhanced real spectrogram 640 and an enhanced imaginary spectrogram 645). Thus, the DNN-SE 360 multiplies the speech mask data by the AEC-Out spectrogram 630 to generate the enhanced spectrogram data, which ideally only has de-reverberant speech minus additive noise and residual echo. In some examples, the DNN-SE 360 only calculates the enhanced spectrogram data in a loss function and/or during inferencing, although the disclosure is not limited thereto.

As illustrated in FIG. 6B, in some examples the DNN-AIC 390 may include the DNN-AIC 450 as part of the robust deep complex convolutional recurrent neural network (rDCRN) 610. For example, the DNN-AIC 450 may process the AEC-Out real spectrogram 410, the AEC-Out imaginary spectrogram 415, the Echo-Est real spectrogram 460, and the Echo-Est imaginary spectrogram 465 in order to generate the speech mask (real) 440 and the speech mask (imaginary) 445, as described above with regard to FIG. 4B. In addition, the DNN-AIC 390 may include the output stage 620 configured to generate the enhanced spectrogram data. For example, the output stage 620 may include the combining (e.g., multiplier) component 635 configured to multiply the speech mask data (e.g., the speech mask (real) 440 and the speech mask (imaginary) 445) with the AEC-Out spectrogram 630 (e.g., the AEC-Out real spectrogram 410 and the AEC-Out imaginary spectrogram 415) to generate the enhanced spectrogram data (e.g., the enhanced real spectrogram 640 and the enhanced imaginary spectrogram 645). Thus, the DNN-AIC 390 multiplies the speech mask data by the AEC-Out spectrogram 630 to generate the enhanced spectrogram data, which ideally only has de-reverberant speech without any traces of additive noise and residual echo. In some examples, the DNN-AIC 390 only calculates the enhanced spectrogram data in a loss function and/or during inferencing, although the disclosure is not limited thereto.

While FIGS. 4A-4B illustrate the DNN 400/450 generating speech mask data, the disclosure is not limited thereto and the output of the DNN 400/450 may vary without departing from the disclosure. In other examples, the DNN 400/450 may generate complex spectrogram data representing the speech without departing from the disclosure. For example, instead of generating the speech mask data and combining the speech mask data with the AEC output data 314 to generate the complex spectrogram data representing the speech, the DNN 400/450 may be configured to directly output complex spectrogram data representing the speech. Thus, the DNN 400/450 may process the AEC output data 314 to perform dereverberation, noise reduction, and/or residual echo suppression and generate the complex spectrogram data without departing from the disclosure.

In some examples, the DNN 360/390 may generate complex spectrogram data representing the speech, such as the enhanced real spectrogram 640 and enhanced imaginary spectrogram 645 illustrated in FIGS. 6A-6B. Thus, additional components (e.g., RES component 370, CNG component 330, AGC component, and/or the like) of the device 110 may further process the complex spectrogram data before generating output audio data in the time domain (e.g., by performing overlap and add filtering and/or the like). However, the disclosure is not limited thereto, and in other examples the DNN 360/390 may output processed audio data without departing from the disclosure. For example, the device 110 may process the third audio data using the trained model to generate speech mask data, and the device 110 may then use the speech mask data to generate the processed audio data in the time domain without departing from the disclosure.

FIG. 7 is a block diagram conceptually illustrating example components of a system according to embodiments of the present disclosure. In operation, the system 100 may include computer-readable and computer-executable instructions that reside on the device 110, as will be discussed further below.

The device 110 may include one or more audio capture device(s), such as a microphone array which may include one or more microphones 112. The audio capture device(s) may be integrated into a single device or may be separate. The device 110 may also include an audio output device for producing sound, such as loudspeaker(s) 114. The audio output device may be integrated into a single device or may be separate.

As illustrated in FIG. 7, the device 110 may include an address/data bus 724 for conveying data among components of the device 110. Each component within the device 110 may also be directly connected to other components in addition to (or instead of) being connected to other components across the bus 724.

The device 110 may include one or more controllers/processors 704, which may each include a central processing unit (CPU) for processing data and computer-readable instructions, and a memory 706 for storing data and instructions. The memory 706 may include volatile random access memory (RAM), non-volatile read only memory (ROM), non-volatile magnetoresistive (MRAM) and/or other types of memory. The device 110 may also include a data storage component 708, for storing data and controller/processor-executable instructions (e.g., instructions to perform operations discussed herein). The data storage component 708 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 702.

The device 110 includes input/output device interfaces 702. A variety of components may be connected through the input/output device interfaces 702. For example, the device 110 may include one or more microphone(s) 112 (e.g., a plurality of microphone(s) 112 in a microphone array), one or more loudspeaker(s) 114, and/or a media source such as a digital media player (not illustrated) that connect through the input/output device interfaces 702, although the disclosure is not limited thereto. Instead, the number of microphone(s) 112 and/or the number of loudspeaker(s) 114 may vary without departing from the disclosure. In some examples, the microphone(s) 112 and/or loudspeaker(s) 114 may be external to the device 110, although the disclosure is not limited thereto. The input/output interfaces 702 may include A/D converters (not illustrated) and/or D/A converters (not illustrated).

The input/output device interfaces 702 may also include an interface for an external peripheral device connection such as universal serial bus (USB), FireWire, Thunderbolt, Ethernet port or other connection protocol that may connect to network(s) 199.

The input/output device interfaces 702 may be configured to operate with network(s) 199, for example via an Ethernet port, a wireless local area network (WLAN) (such as WiFi), Bluetooth, ZigBee and/or wireless networks, such as a Long Term Evolution (LTE) network, WiMAX network, 3G network, etc. The network(s) 199 may include a local or private network or may include a wide network such as the internet. Devices may be connected to the network(s) 199 through either wired or wireless connections.

The device 110 may include components that may comprise processor-executable instructions stored in storage 708 to be executed by controller(s)/processor(s) 704 (e.g., software, firmware, hardware, or some combination thereof). For example, components of the device 110 may be part of a software application running in the foreground and/or background on the device 110. Some or all of the controllers/components of the device 110 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Computer instructions for operating the device 110 and its various components may be executed by the controller(s)/processor(s) 704, using the memory 706 as temporary "working" storage at runtime. The computer instructions may be stored in a non-transitory manner in non-volatile memory 706, storage 708, or an external device. Alternatively, some or all of the executable instructions may be embedded in hardware or firmware in addition to or instead of software.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the fixed beamformer, acoustic echo canceller (AEC), adaptive noise canceller (ANC) unit, residual echo suppression (RES), double-talk detector, etc. may be implemented by a digital signal processor (DSP).

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving first audio data corresponding to first audio generated by a loudspeaker;
   receiving second audio data corresponding to audio captured by at least one microphone, the second audio data representing the first audio and second audio, the second audio including speech;
   performing, using the first audio data and the second audio data, echo cancellation to generate third audio data and echo estimate data;
   generating, using a neural network and the third audio data, first data representing the second audio, wherein the neural network is configured to perform noise reduction and dereverberation processing configured to reduce a reverberation associated with the speech; and
   generating, using the first data, fourth audio data representing the second audio.

2. The computer-implemented method of claim 1, wherein the third audio data includes a first representation of the first audio and a first representation of the second audio, and generating the first data further comprises:
   generating, using the neural network and the third audio data, speech mask data corresponding to the third audio data; and
   generating, using the third audio data and the speech mask data, the first data, wherein the first data includes a second representation of the first audio and a second representation of the second audio, the second representation of the first audio being attenuated relative to the first representation of the first audio.

3. The computer-implemented method of claim 1, wherein generating the first data further comprises:
   processing, using the neural network, the third audio data and the echo estimate data to generate speech mask data; and
   generating, using the third audio data and the speech mask data, the first data.

4. The computer-implemented method of claim 1, wherein generating the fourth audio data further comprises:
   performing, using the echo estimate data and the first data, residual echo suppression processing to generate second data;
   generating, using the second data, noise data; and
   generating, using the second data and the noise data, the fourth audio data.

5. The computer-implemented method of claim 1, wherein generating the first data further comprises using the echo estimate data, and generating the fourth audio data further comprises:
   generating, using the first data, noise data; and
   generating, using the first data and the noise data, the fourth audio data.

6. The computer-implemented method of claim 1, further comprising:

generating, using the third audio data, first spectrogram data and second spectrogram data, wherein the first spectrogram data represents real components of the third audio data and the second spectrogram data represents imaginary components of the third audio data, wherein generating the first data further comprises generating, using the neural network and the first spectrogram data and the second spectrogram data, first speech mask data and second speech mask data, wherein the first speech mask data represents real components of the speech and the second speech mask data represents imaginary components of the speech.

7. The computer-implemented method of claim 1, further comprising:
generating, using the third audio data, first spectrogram data and second spectrogram data, wherein the first spectrogram data represents real components of the third audio data and the second spectrogram data represents imaginary components of the third audio data;
generating, using the echo estimate data, third spectrogram data and fourth spectrogram data, wherein the third spectrogram data represents real components of the echo estimate data and the fourth spectrogram data represents imaginary components of the echo estimate data; and
generating the first data further comprises generating, using (i) the neural network, (ii) the first spectrogram data, (iii) the second spectrogram data, (iv) the third spectrogram data, and (v) the fourth spectrogram data, first speech mask data and second speech mask data, wherein the first speech mask data represents real components of the speech and the second speech mask data represents imaginary components of the speech.

8. The computer-implemented method of claim 1, wherein generating the first data further comprises:
generating, by the neural network and based on the third audio data, speech mask data; and
generating, using the speech mask data, the first data, wherein generating the fourth audio data further comprises:
performing residual echo suppression on the first data using the echo estimate data and the speech mask data.

9. The computer-implemented method of claim 1, wherein the neural network further comprises:
an encoder including a first plurality of convolutional layers;
a decoder including a second plurality of convolutional layers; and
a plurality of skip connections between the encoder and the decoder.

10. The computer-implemented method of claim 1, wherein the second audio data includes a first representation of the first audio and a first representation of the second audio, and performing the echo cancellation further comprises:
generating, using the first audio data and at least one adaptive filter, the echo estimate data, wherein the echo estimate data includes a representation of at least a portion of the first audio; and
generating the third audio data using the second audio data and the echo estimate data, wherein the third audio data includes a second representation of the first audio and a second representation of the second audio, the second representation of the first audio being attenuated relative to the first representation of the first audio.

11. A system comprising:
at least one processor; and
memory including instructions operable to be executed by the at least one processor to cause the system to:
receive first audio data corresponding to first audio generated by a loudspeaker;
receive second audio data corresponding to audio captured by at least one microphone, the second audio data representing the first audio and second audio, the second audio including speech;
perform, using the first audio data and the second audio data, echo cancellation to generate third audio data and echo estimate data;
generate, using a neural network and the third audio data, first data representing the second audio, wherein the neural network is configured to perform noise reduction and dereverberation processing configured to reduce a reverberation associated with the speech; and
generate, using the first data, fourth audio data representing the second audio.

12. The system of claim 11, wherein the third audio data includes a first representation of the first audio and a first representation of the second audio and the memory further comprises instructions that, when executed by the at least one processor, further cause the system to:
generate, using the neural network and the third audio data, speech mask data; and
generate, using the third audio data and the speech mask data, the first data, wherein the first data includes a second representation of the first audio and a second representation of the second audio, the second representation of the first audio being attenuated relative to the first representation of the first audio.

13. The system of claim 11, wherein the memory further comprises instructions that, when executed by the at least one processor, further cause the system to:
perform, using the echo estimate data and the first data, residual echo suppression processing to generate second data;
generate, using the second data, noise data; and
generate, using the second data and the noise data, the fourth audio data-third data.

14. The system of claim 11, wherein the memory further comprises instructions that, when executed by the at least one processor, further cause the system to:
generate, using the first data, noise data; and
generate, using the first data and the noise data, the fourth audio data.

15. The system of claim 11, wherein the memory further comprises instructions that, when executed by the at least one processor, further cause the system to:
generate, using the third audio data, first spectrogram data and second spectrogram data, wherein the first spectrogram data represents real components of the third audio data and the second spectrogram data represents imaginary components of the third audio data; and
generate, using the neural network and the first spectrogram data and the second spectrogram data, first speech mask data and second speech mask data, wherein the first speech mask data represents real components of the speech and the second speech mask data represents imaginary components of the speech.

16. The system of claim 11, wherein the memory further comprises instructions that, when executed by the at least one processor, further cause the system to:
generate, using the third audio data, first spectrogram data and second spectrogram data, wherein the first spectrogram data represents real components of the third audio data and the second spectrogram data represents imaginary components of the third audio data;
generate, using the echo estimate data, third spectrogram data and fourth spectrogram data, wherein the third spectrogram data represents real components of the echo estimate data and the fourth spectrogram data represents imaginary components of the echo estimate data; and
generate, using (i) the neural network, (ii) the first spectrogram data, (iii) the second spectrogram data, (iv) the third spectrogram data, and (v) the fourth spectrogram data, first speech mask data and second speech mask data, wherein the first speech mask data represents real components of the speech and the second speech mask data represents imaginary components of the speech.

17. The system of claim 12, wherein the speech mask data includes a first value associated with a first frequency band of the third audio data and a second value associated with a second frequency band of the third audio data.

18. A computer-implemented method, the method comprising:
receiving first audio data corresponding to first audio generated by a loudspeaker;
receiving second audio data corresponding to audio captured by at least one microphone, the second audio data representing the first audio and second audio, the second audio including speech;
performing, using the first audio data and the second audio data, echo cancellation to generate third audio data and echo estimate data;
generating, using a neural network and the third audio data, first data representing the second audio, wherein the neural network is configured to perform noise reduction, dereverberation processing, and residual echo suppression; and
generating, using the first data, fourth audio data representing the second audio.

19. The computer-implemented method of claim 18, wherein generating the first data further comprises:
generating first complex spectrogram data corresponding to the third audio data;
generating, using the neural network and the first complex spectrogram data, speech mask data; and
generating, using the first complex spectrogram data and the speech mask data, the first data.

20. The computer-implemented method of claim 18, wherein generating the first data further comprises using the echo estimate data, and generating the fourth audio data further comprises:
generating, using the first data, noise data;
generating, using the first data and the noise data, second data; and
generating, using the second data, the fourth audio data.

* * * * *